US012313517B2

(12) United States Patent
Khanna et al.

(10) Patent No.: US 12,313,517 B2
(45) Date of Patent: May 27, 2025

(54) AIR QUALITY ASSESSMENT BASED UPON OPTICAL ABSORBANCE

(71) Applicant: 3M INNOVATIVE PROPERTIES COMPANY, St. Paul, MN (US)

(72) Inventors: Aloka Khanna, Woodbury, MN (US); Deepti Pachauri, Minneapolis, MN (US); Michael L. Munson, Maple Grove, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 251 days.

(21) Appl. No.: 17/998,979

(22) PCT Filed: May 20, 2021

(86) PCT No.: PCT/IB2021/054372
§ 371 (c)(1),
(2) Date: Nov. 16, 2022

(87) PCT Pub. No.: WO2021/234622
PCT Pub. Date: Nov. 25, 2021

(65) Prior Publication Data

US 2023/0213426 A1 Jul. 6, 2023

Related U.S. Application Data

(60) Provisional application No. 63/028,464, filed on May 21, 2020.

(51) Int. Cl.
*G01J 3/42* (2006.01)
*G01N 15/0205* (2024.01)
(Continued)

(52) U.S. Cl.
CPC ......... *G01N 15/06* (2013.01); *G01N 15/0205* (2013.01); *G01N 15/075* (2024.01)

(58) Field of Classification Search
CPC .. G01N 15/06; G01N 15/0205; G01N 15/075; G01N 21/85; G01N 21/314; G01N 2015/0046; G01N 2015/0277; G01J 3/42
See application file for complete search history.

(56) References Cited

U.S. PATENT DOCUMENTS 4,415,265 A * 11/1983 Campillo ............... G01N 15/00 356/342
4,790,650 A 12/1988 Keady
(Continued)

FOREIGN PATENT DOCUMENTS

CN 205826472 U 12/2016
CN 107328695 A 11/2017
(Continued)

OTHER PUBLICATIONS

Aduev, "A Study into Light Scattering and Absorption by Aluminum Nanoparticles in PETN", Journal of Physics: Conference Series, Sep. 2014, No. 552, pp. 012032 (8 pages).
(Continued)

*Primary Examiner* — Abdullahi Nur

(57) ABSTRACT

A method and system of determining air quality are disclosed. In examples, a method comprises identifying one or more aerosol particle types based on an absorbance spectra of aerosol particles captured on a filter and determining a mass concentration of each of the one or more aerosol particle types based on the absorbance spectra and the aerosol particle type. The method further comprises detecting a median particle size of each of the one or more aerosol particle types based on a rate of change of the absorbance spectra and the aerosol particle type. The method further comprises determining an air quality metric based on the identified one or more aerosol particle types, the determined mass concentration of each of the one or more aerosol
(Continued)

particle types, and the determined median particle size of each of the one or more aerosol particle types.

20 Claims, 19 Drawing Sheets

(51) Int. Cl.

| | |
|---|---|
| ***G01N 15/06*** | (2006.01) |
| *G01N 15/075* | (2024.01) |

(56) References Cited

U.S. PATENT DOCUMENTS

| | | | | |
|---|---|---|---|---|
| 5,072,626 | A | 12/1991 | Ensor et al. | |
| 7,812,306 | B2 | 10/2010 | Fissan et al. | |
| 8,301,396 | B1 | 10/2012 | Dhanijala et al. | |
| 9,013,693 | B2 | 4/2015 | Yamamoto et al. | |
| 9,035,242 | B2 | 5/2015 | Caldow et al. | |
| 9,874,518 | B2 | 1/2018 | Sato et al. | |
| 9,970,855 | B2 | 5/2018 | Dhaniyala et al. | |
| 10,012,628 | B2 | 7/2018 | Hasegawa et al. | |
| 10,018,552 | B2 | 7/2018 | Tanaka et al. | |
| 10,031,063 | B2 | 7/2018 | Tahara et al. | |
| 10,209,212 | B2 | 2/2019 | Ruhl et al. | |
| 2004/0259267 | A1 | 12/2004 | Gundel et al. | |
| 2006/0146327 | A1* | 7/2006 | Wang ................. | G01N 15/0266 356/338 |
| 2006/0290944 | A1 | 12/2006 | Arnott et al. | |
| 2017/0241893 | A1* | 8/2017 | Walls ................. | G01N 15/0205 |
| 2017/0292903 | A1 | 10/2017 | Hasegawa et al. | |
| 2019/0033194 | A1 | 1/2019 | Defreez et al. | |
| 2019/0262756 | A1 | 8/2019 | Arthur et al. | |
| 2019/0277819 | A1 | 9/2019 | Solomon et al. | |
| 2019/0383736 | A1 | 12/2019 | Caubel et al. | |

FOREIGN PATENT DOCUMENTS

| | | | |
|---|---|---|---|
| CN | 105021501 | B | 1/2018 |
| CN | 207675605 | U | 7/2018 |
| CN | 110013713 | A | 7/2019 |
| CN | 107213930 | B | 12/2022 |
| EP | 3450956 | A1 | 3/2019 |
| EP | 3614352 | A2 | 2/2020 |
| JP | 5877810 | B2 | 3/2016 |
| JP | 2017009466 | A | 1/2017 |
| JP | 2017187405 | A | 10/2017 |
| KR | 20130074486 | A | 7/2013 |
| WO | 1991008459 | A1 | 6/1991 |
| WO | 1999010858 | A2 | 3/1999 |
| WO | 2004074817 | A1 | 9/2004 |
| WO | 2007000710 | A2 | 1/2007 |
| WO | 2011145812 | A2 | 11/2011 |
| WO | 2014141994 | A1 | 9/2014 |
| WO | 2014194379 | A1 | 12/2014 |
| WO | 2015012004 | A1 | 1/2015 |
| WO | 2015108023 | A1 | 7/2015 |
| WO | 2015163074 | A1 | 10/2015 |
| WO | 2017090134 | A1 | 6/2017 |
| WO | 2017195785 | A1 | 11/2017 |
| WO | 2018100209 | A2 | 6/2018 |
| WO | 2018222980 | A1 | 12/2018 |
| WO | 2020109963 | A1 | 6/2020 |
| WO | 2020109964 | A1 | 6/2020 |
| WO | 2021229335 | A1 | 11/2021 |

OTHER PUBLICATIONS

Bergstrom, "Spectral Absorption Properties of Atmospheric Aerosols", Atmospheric Chemistry and Physics, 2007, vol. 7, No. 23, pp. 5937-5943.

Cassee, "Particulate Matter Beyond Mass: Recent Health Evidence on the Role of Fractions, Chemical Constituents and Sources of Emission", Inhalation Toxicology, Dec. 2013, vol. 25, No. 14, pp. 802-812.

Chen, "Light Absorption by Organic Carbon from Wood Combustion", Atmospheric Chemistry and Physics, Feb. 2010, vol. 10, pp. 1773-1787.

Han, "Thermal Properties of Carbon Black Aqueous Nanofluids for Solar Absorption", Nanoscale Research Letters, Jul. 2011, vol. 6, Art. 457, 7pages.

International Search Report for PCT Application No. PCT/IB2021/054372, mailed on Aug. 3, 2021, 5 pages.

Jagodnicka, "Particle Size Distribution Retrieval from Multiwavelength Lidar Signals for Droplet Aerosol", Applied Optics, Feb. 2009, vol. 48, No. 4, pp. B8-B16.

Janssen, "Health Effects of Black Carbon", World Health Organization, Regional Office for Europe, 2012, 96 pages.

Jaramillo, "Charged Particle Detection using a Micromechanical Electrometer", In Technical Digest—Solid-State Sensors, Actuators, and Microsystems Workshop , Jun. 2012, pp. 295-298.

Kaye, "Spatial Light-Scattering Analysis as a Means of Characterizing and Classifying Non-Spherical Particles", Measurement Science and Technology, 1998, vol. 9, No. 2, pp. 141-149.

Kelly, "Air Pollution and Public Health: Emerging Hazards and Improved Understanding of Risk", Environmental Geochemistry and Health, Jun. 2015, Vo. 37, No. 4, pp. 631-649.

Nazaroff, "Understanding Ultrafine Particles Indoors", YouTube video [online], Presentation on Jan. 19, 2019, [retrieved from the internet on Jan. 11, 2023], URL<https://www.youtube.com/watch?v=27KpqbWAwwU>.

Sarnat, "Health Effects of Organic Aerosols: Results from the Southeastern Center for Air Pollution & Epidemiology", U.S. EPA STAR Progress Review Meeting: Anthropogenic Influences on Organic Aerosol Formation and Regional Climate Implications, Mar. 2016, 18 pages.

Shao, "Fine Particle Sensor Based on Multi-Angle Light Scattering and Data Fusion", Sensors, 2017, vol. 17, pp. 1033/1-1033/15.

Stramski, "Optical Properties of Asian Mineral Dust Suspended in Seawater", Limnology Oceanography, May 2004, vol. 49, No. 3, pp. 749-755.

Uthe, "Particle size evaluations using multiwavelength extinction measurements", Applied Optics, Feb. 1982, Vo. 21, No. 3, pp. 454-459.

Vette, "Characterization of Indoor-Outdoor Aerosol Concentration Relationships during the Fresno PM Exposure Studies", Aerosol Science and Technology, 2001, vol. 34, No. 1, pp. 118-126.

Wasisto, "Portable Cantilever-Based Airborne Nanoparticle Detector", Sensors and Actuators B: Chemical, Oct. 2013, vol. 187, pp. 118-127.

* cited by examiner

1200

1300

AIR QUALITY ASSESSMENT BASED UPON OPTICAL ABSORBANCE

TECHNICAL FIELD

The disclosure relates to air quality measurements.

BACKGROUND

Indoor air quality monitoring systems may detect particulate matter and provide quantitative information regarding the size and concentration of the particles. Conventional indoor air quality monitors are based on light scattering methods, and do not account for particle refractive indices, particle shape, particle size distribution, humidity, etc. As such, conventional air quality monitoring systems cannot provide information regarding material composition and suffer poor accuracy of particle size distribution and mass accumulation measurements.

Research grade instruments are available for aerosol composition analysis that are expensive, bulky and not convenient for field deployment. The cost of such equipment is anywhere from tens to hundreds of thousands of dollars, and the form factor is not convenient for monitoring indoor air quality.

An air filter may be included in furnaces and stand-alone air purifiers. Air is drawn through the filter, and the filter traps particles, preventing them from proceeding through ducts to environmental spaces that are being heated, cooled, or otherwise conditioned.

In-home air filters become ineffective or blocked over time and need to be replaced to minimize wear on furnace fan motors as well as to maintain air purification effectiveness and maintain adequate airflow. Traditional filter obstruction is defined by the difference in pressure before the filter and after the filter in respect to airflow. An increase in the difference in pressure has been considered indicative of the filter becoming more blocked and needing replacement.

SUMMARY

In general, the present disclosure describes methods and systems for determining air quality based on electromagnetic radiation absorbance measurements of aerosol material captured on the filter.

In some examples, aerosol material type and composition may be determined via absorbance measurements. Absorbance spectra may provide differentiation between various aerosol particle materials captured on a filter and may provide a signature of the aerosol material source, e.g., fossil fuel burning, forest fires, biomass burning, minerals in ocean dust, aerosol particulates in buildings, and the like. Absorbance spectra, as used herein throughout the disclosure, may refer to one or more absorbance spectrum.

In another example, the mass loading on a filter may be determined by a change in the absorbance spectra at a specific wavelength, specific wavelengths, or a wavelength range or plurality of wavelength ranges. Higher mass loading of a material on the filter may cause higher absorbance at a given wavelength, and the absorbance at the given wavelength may be calibrated to yield a mass of a particular material captured on the filter.

In another example, aerosol particle size may be determined via an absorption angstrom exponent determined from absorbance measurements. The absorption angstrom exponent is a measure of the change in extinction coefficient as a function of wavelength and is inversely proportional to particle size of the aerosol material, e.g., smaller particles yield higher absorption angstrom exponent. In order to determine the absorption angstrom exponent, the absorbance at any two wavelengths for the aerosol material may be recorded and the results may be extrapolated to generate the absorbance spectrum over a wavelength range. The rate of change of absorbance over this wavelength range may be used to predict the median particle diameter. In some examples, the rate of change of absorbance over the wavelength range may be indicative of ultrafine aerosol particles, for example, particles having a median diameter of less than 300 nm and/or less than 100 nm.

In another example, a quality of air may be determined based on the determined mass loading and median particle size. For example, an air quality score, e.g., an air quality metric, may be calculated based on a mass accumulation on the filter and the median particle size. In some examples, an air quality score may be determined following the Environmental Protection Agency (EPA) air quality scale for PM2.5 and PM10 particulate matter.

Accordingly, the techniques disclosed may provide a simple, low-cost method and system which may determine aerosol material composition, filter mass loading, median particle size, and air quality. Further, the techniques disclosed may provide a tool for a consumer to determine when to change a filter and may improve rates of filter changes for consumers living in regions of bad air quality. The techniques disclosed additionally may provide containment monitoring for workplace environmental, health, and safety assessments, and for ventilation control in commercial buildings. Still further, the techniques disclosed may provide a tool for automatically determining the source of bad air quality so as to take necessary corrective action.

In some examples, the disclosure describes a method of determining air quality, the method comprising: identifying one or more aerosol particle types based on an absorbance spectra of aerosol particles captured on a filter; determining a mass concentration of each of the one or more aerosol particle types based on the absorbance spectra and the aerosol particle type; detecting a median particle size of each of the one or more aerosol particle types based on a rate of change of the absorbance spectra and the aerosol particle type; and determining an air quality metric based on the identified one or more aerosol particle types, the determined mass concentration of each of the one or more aerosol particle types, and the determined median particle size of each of the one or more aerosol particle types.

In some examples, the disclosure describes a computer-readable storage medium comprising instructions that configure one or more programmable processors to: identify one or more aerosol particle types based on an absorbance spectra of aerosol particles captured on a filter; determine a mass concentration of each of the one or more aerosol particle types based on the absorbance spectra and the aerosol particle type; detect a median particle size of each of the one or more aerosol particle types based on a rate of change of the absorbance spectra and the aerosol particle type; determine an air quality metric based on the identified one or more aerosol particle types, the determined mass concentration of each of the one or more aerosol particle types, and the determined median particle size of each of the one or more aerosol particle types; and display the air quality metric.

In some examples, the disclosure describes a system comprising: one or more light source; one or more detector; at least one computer-readable storage medium comprising instructions that configure one or more programmable processors to: identify one or more aerosol particle types based on an absorbance spectra of aerosol particles captured on a filter; determine a mass concentration of each of the one or more aerosol particle types based on the absorbance spectra and the aerosol particle type; detect a median particle size of each of the one or more aerosol particle types based on a rate of change of the absorbance spectra and the aerosol particle type; and determine an air quality metric based on the identified one or more aerosol particle types, the determined mass concentration of each of the one or more aerosol particle types, and the determined median particle size of each of the one or more aerosol particle types; and display the air quality metric.

The details of one or more examples are set forth in the accompanying drawings and the description below. Other features, objects, and advantages will be apparent from the description and drawings, and from the claims.

DETAILED DESCRIPTION

Figure 1:
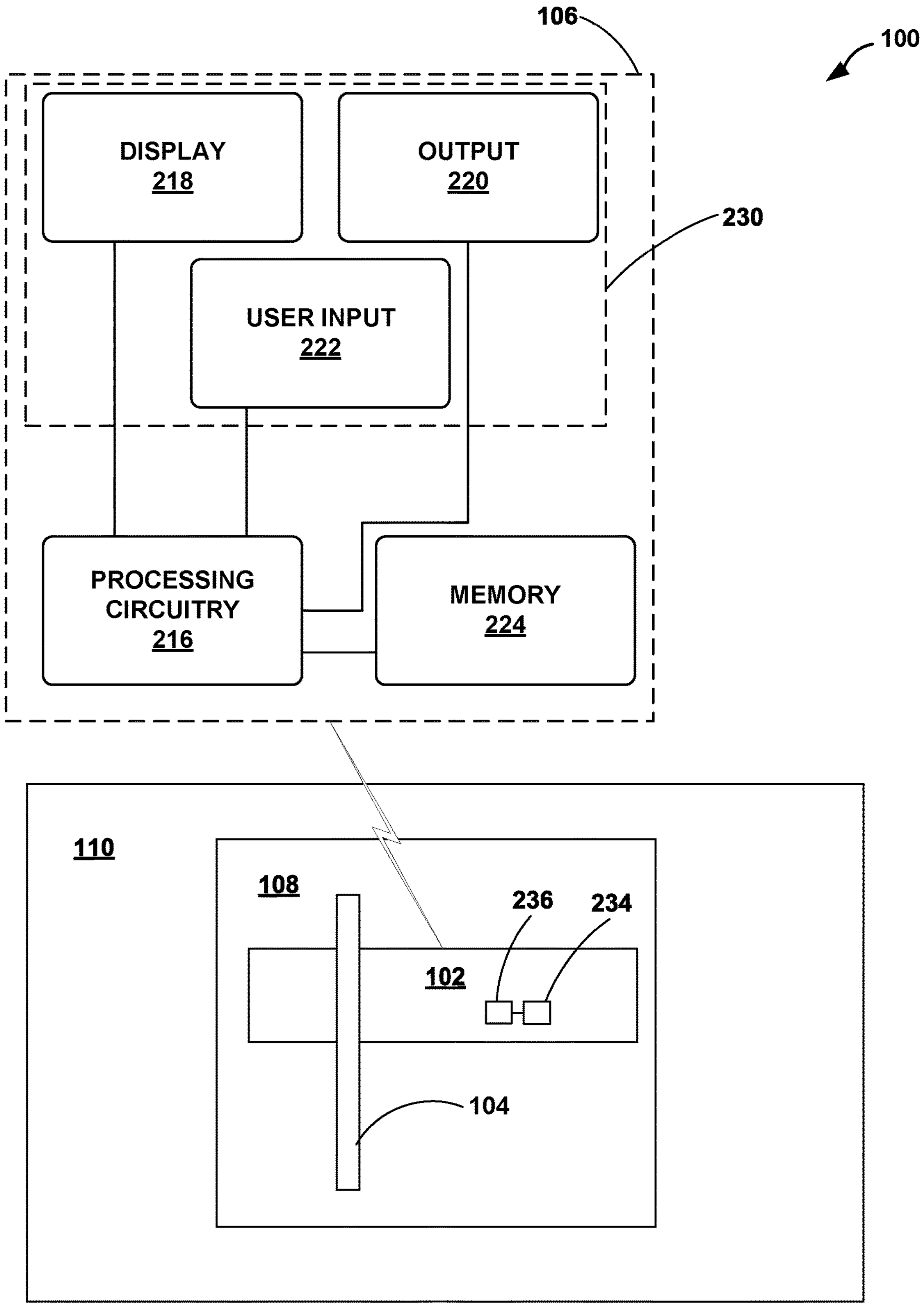
FIG. 1 is an illustration depicting an example optical measurement system, in accordance with the techniques described in this disclosure.

The present disclosure relates to determining air quality by sensing mass loading, identification and quantification of the materials captured on filter media through absorbance measurements of electromagnetic radiation, e.g., optical absorbance measurements.

Filter media may be included as part of an air filter, for example, a disposable air filter. An air filter may have a generally rectangular shape having a first surface upstream of the direction of air flow and a second surface downstream of the direction of air flow. The air filter may comprise filter media surrounded by an optional perimeter frame. The perimeter frame may comprise sidewalls, e.g., top, bottom, left, and right sidewalls. The perimeter frame sidewalls may be made of any suitable material(s), e.g., paperboard, cardboard, injection molded plastic, and the like. The air filter may include support members that extend at least partially across the filter media. The filter media may be comprised of nearly any material, in any configuration, that is capable of filtering moving air. For example, filter media may include, but is not limited to, fibrous materials (e.g., nonwoven webs, fiberglass webs, and so on), honeycomb structures loaded with filter media and/or sorbent material, and so on. Generally, an air filter and filter media may be such as described in U.S. patent application Ser. No. 16/319,243, hereby incorporated by reference in its entirety.

Air quality may be determined via monitoring of particulate matter in a volume of air, or alternatively, determining the content of particulate matter captured via an air filter of an air movement system configured to move and/or circulate a volume of air. For example, air quality may be determined based on a mass accumulation of particles and particle sizes. Conventional systems available for particle sizing and mass accumulation quantification are based on the principle of light scattering, e.g., by correlating the intensity of scattered light to aerosol particle size. One by one, the particles in the air stream are binned into specific sizes based upon scattered light intensity. This information is utilized to generate a particle size distribution and mass accumulation calculation of the airborne particulate matter. Scattered light intensity alone is insufficient to provide any information regarding the material composition. Additionally, the scattered light intensity is not a singular function of the particle size, but depends heavily on additional variables, e.g., the refractive index of the particles, particle shape, overall particle size distribution, detector geometry, e.g., scattering angle, viewing volume, wavelength of the light source, and environmental factors such as relative humidity. Many of these variables, apart from detector geometry, viewing volume, and wavelength of the light source, are unaccounted for in the particle sizing algorithm of the detector. As such, the measurements of conventional air quality monitors deviate from the actual concentration and suffer reduced accuracy in particle concentration and distribution measurements when one or more of the variables above are different from the calibration conditions for the detector. Consequently, conventional systems are both incapable of providing information regarding the material composition of the particles and suffer poor accuracy of particle size distribution and mass accumulation measurements.

The disclosed methods of determining aerosol material type, particle size, and mass loading based on absorbance of electromagnetic radiation may be more accurate compared to conventional systems. For example, disclosed methods may first determine the aerosol material composition. An absorbance calibration specific to the determined material may be utilized for mass loading and particle size determinations. The methods and systems of the present disclosure may additionally provide compositional and aerosol source information. In addition, the methods and systems of the present disclosure may improve the accuracy and reliability of measurements in the presence of humidity, water vapor, and/or varying levels of humidity in the ambient air and captured by a filter.

Absorbance spectra may provide differentiation between various components in the real-world aerosol particles and may additionally provide a signature for the aerosol source. Absorbance spectra, as used herein throughout the disclosure, may refer to one or more absorbance spectrum. In one example, aerosol sources consisting of high amounts of black carbon exhibit significant absorbance over a broad spectral range encompassing ultraviolet, visible, and infrared (UV/Vis/IR) wavelength ranges. Organic carbon, by contrast, exhibits some absorbance in the UV and blue wavelength ranges, but exhibits negligible or no absorbance over the longer Vis and IR wavelength ranges. Primary sources of black and organic carbon are fossil fuels, forest fires, biomass burning, etc. The percentage of black and organic carbon generated through different aerosol sources, e.g., biomass burning and fossil fuels, is different, leading to different absorbance characteristics for aerosol materials originating from each source. The differential absorbance at different wavelengths of light can be traced back to the aerosol source, e.g., the source of the smoke.

In another example, Asian mineral dust gathered near marine seawaters exhibits absorbance in near-UV and blue wavelength ranges, metallic (aluminum) particles exhibit strong reflectance and less absorbance compared to the carbon species. As such, the differentiating features in the absorbance spectra of a myriad of aerosol sources can be utilized to determine aerosol source and the individual components in the aerosol source, e.g., the fraction of black versus organic carbon in biomass burning, the amount of specific minerals in ocean dust, etc.

The mass loading on the filter may be determined by a change in the absorbance of electromagnetic radiation at a specific wavelength and/or frequency. Higher mass loading of a material on the filter may cause higher absorbance at a given wavelength. The absorbance at a given wavelength may be calibrated to yield a mass of a particular material captured on the filter.

The size of aerosol particles captured on the filter may be determined via absorption angstrom exponent. Absorption angstrom exponent is a measure of the change in extinction coefficient as a function of wavelength and is inversely proportional to particle size of the aerosol material, e.g., smaller particles yield higher absorption angstrom exponent. In order to determine the absorption angstrom exponent, the absorbance at any two wavelengths for the aerosol material may be recorded and the results may be extrapolated to generate the absorbance spectrum over a wavelength range. The rate of change of absorbance over this wavelength range may be used to predict the median particle diameter.

An air quality may be determined based on mass loading and median particle size. For example, an air quality score, e.g., an air quality metric, may be calculated based on a mass accumulation on the filter and the median particle size. In some examples, an air quality score may be determined following the Environmental Protection Agency (EPA) air quality scale for PM2.5 and PM10 particulate matter.

FIG. 1 is an illustration depicting an example optical measurement system 100, in accordance with the techniques described in this disclosure. In the example shown, optical measurement system 100 includes optical sensing system 102 and computing device 106. Optical sensing system 102 may be located within air movement system 108 including filter 104, and air movement system 108 may be located within volume 110, for example, a room 110. Optical sensing system 102 may be communicatively coupled, for example by a wired or a wireless connection, to computing device 106. In the illustrated example, computing device 106 may include processing circuitry 216 coupled to display 218, output 220, and user input 222 of a user interface 230.

In some examples, optical sensing system 102 may be configured to emit and detect optical signals to filter 104. The optical signals, or information corresponding to the optical signals, may be transferred to computing device 106 for processing, for example, by a wired or wireless connection between optical sensing system 102 and computing device 106. In some examples, optical sensing system 102 may include processing circuitry 236 and memory 234 and may process the electrical signals without transferring the electrical signals to computing device 106.

Optical sensing system 102 may include optical emitters and optical sensors, as further illustrated and described below with respect to FIGS. 2-3.

Filter 104 may include any air filter or air filter media. For example, filter 104 may include a fiberglass filter, a polyester pleated filter, a high efficiency particulate arrestance (HEPA) filter, a foam filter, a washable filter, an electrostatic filter, and the like.

Air movement system 108 may include any air handling system, for example, a heating, ventilating, and air-conditioning (HVAC) system or a room air purifier. Air movement system 108 may include filter 104 to provide clean, dust-free air to volume 110 and to protect and keep downstream components of air movement system 108 clean.

Processing circuitry 216 of computing device 106, as well as processing circuitry 236 and other processing modules or circuitry described herein, may be any suitable software, firmware, hardware, or combination thereof. Processing circuitry 216 may include any one or more microprocessors, controllers, digital signal processors (DSPs), application specific integrated circuits (ASICs), field-programmable gate arrays (FPGAs), or discrete logic circuitry. The functions attributed to processors described herein, including processing circuitry 216, may be provided by processing circuitry of a hardware device, e.g., as supported by software and/or firmware.

In some examples, processing circuitry 216, as well as processing circuitry 236, is configured to determine air quality based on measurements from optical sensing system 102. For example, processing circuitry 216 may determine aerosol material type, composition, mass loading, and median particle diameter based on absorbance spectra measurements of filter 104. Processing circuitry 216 may perform any suitable signal processing of information corresponding to detected optical signals to filter the signals, such as any suitable band-pass filtering, adaptive filtering, closed-loop filtering, any other suitable filtering or processing as described herein, and/or any combination thereof. Processing circuitry 216 may also receive input signals from additional sources (not shown). For example, processing circuitry 216 may receive an input signal containing information about filter 104, air movement system 108, or volume 110. Additional input signals may be used by processing circuitry 216 in any of the calculations or operations it performs in accordance with optical measurement system 100. In some examples, processing circuitry 216 may be adapted to execute software, which may include an operating system and one or more applications, as part of performing the functions described herein. In some examples, processing circuitry 216 may include one or more processing circuitry for performing each or any combination of the functions described herein.

In some examples, processing circuitry 216 may be coupled to memory 224, and processing circuitry 236 may be coupled to memory 234. Memory 224, as well as memory 234, may include any volatile or non-volatile media, such as a random-access memory (RAM), read only memory (ROM), non-volatile RAM (NVRAM), electrically erasable programmable ROM (EEPROM), flash memory, and the like. Memory 224 may be a storage device or other non-transitory medium. Memory 224 may be used by processing circuitry 216 to, for example, store fiducial information or initialization information corresponding to optical sensing, such as absorbance measurements. In some examples, processing circuitry 216 may store optical measurements or previously received data from electrical signals in memory 224 for later retrieval. In some examples, processing circuitry 216 may store determined values, such as information corresponding to detected optical signals, or any calculated values, in memory 224 for later retrieval.

Processing circuitry 216 may be coupled to user interface 230 including display 218, user input 222, and output 220. In some examples, display 218 may include one or more display devices (e.g., monitor, PDA, mobile phone, tablet computer, any other suitable display device, or any combination thereof). For example, display 218 may be configured to display optical absorbance measurements, an air quality metric, aerosol material type, composition, mass loading, and median particle diameter determined by optical measurement system 100. In some examples, user input 222 is configured to receive input from a user, e.g., information about air movement system 108 and/or optical sensing system 102 such as air temperatures and air temperature set points, air flow rates and fan speeds, air pressures, air movement system 108 settings and diagnostic information, and optical sensing system 102 settings and diagnostic information.

User input 222 may include components for interaction with a user, such as a keypad and a display, which may be the same as display 218. In some examples, the display may be a cathode ray tube (CRT) display, a liquid crystal display (LCD) or light emitting diode (LED) display and the keypad may take the form of an alphanumeric keypad or a reduced set of keys associated with particular functions. User input 222, additionally or alternatively, include a peripheral pointing device, e.g., a mouse, via which a user may interact with the user interface. In some examples, the displays may include a touch screen display, and a user may interact with user input 222 via the touch screens of the displays. In some examples, the user may also interact with user input 222 remotely via a networked computing device.

Figure 2:
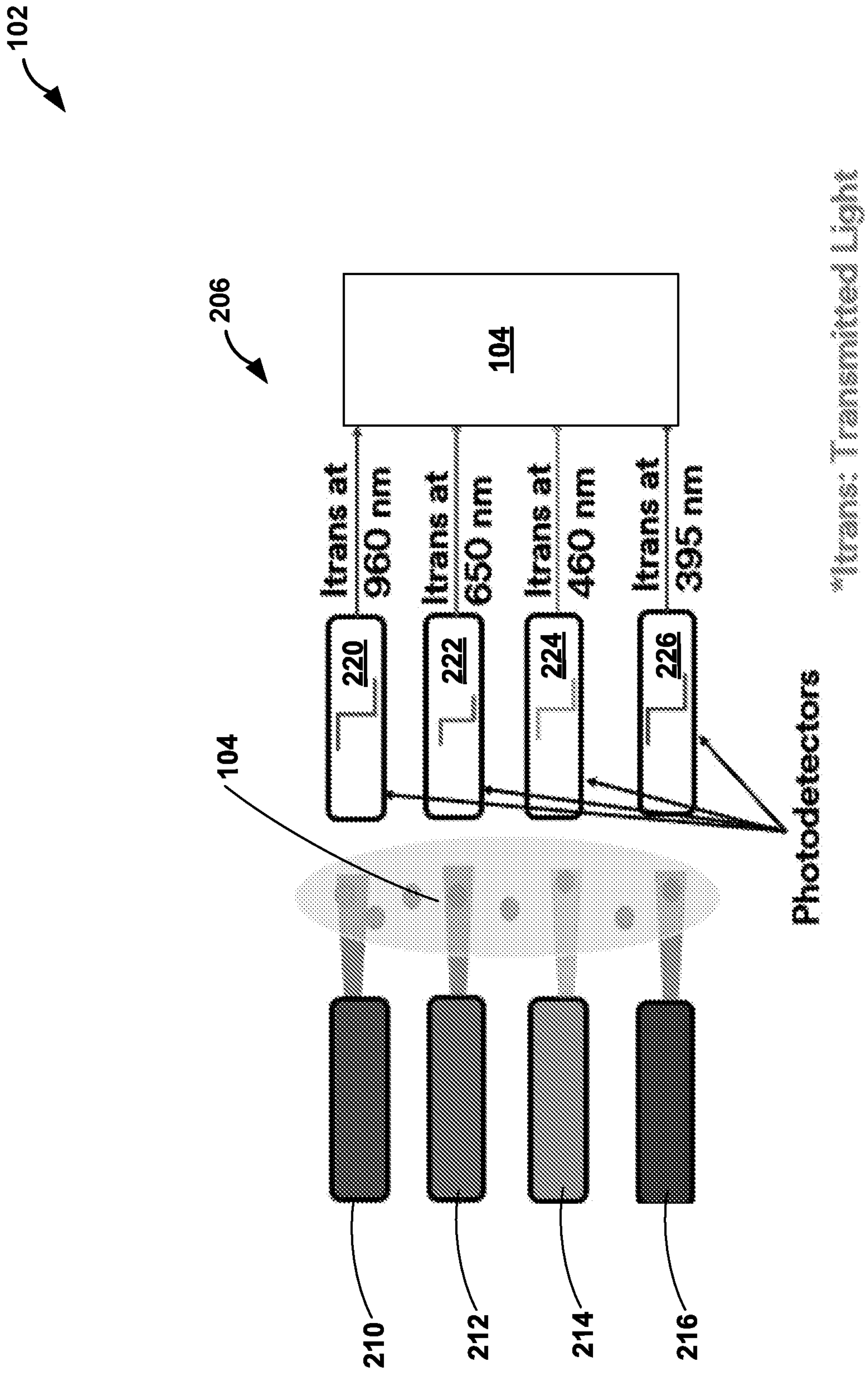
FIG. 2 is a conceptual diagram illustrating an example optical sensing system, in accordance with one or more techniques of this disclosure.

FIG. 2 is a conceptual diagram illustrating an example optical sensing system 102, in accordance, in accordance with one or more techniques of this disclosure. In the example shown, optical sensing system 102 includes filter 104 and optical sensor 206.

In the example shown, optical sensor 206 includes a plurality of light sources 210-216, and a plurality of photodetectors 220-226. For example, light sources 210-216 may include a plurality of monochromatic light sources such as lasers, where each laser is configured to emit a particular wavelength of electromagnetic radiation. Although four light sources and four photodetectors are shown, optical sensor 206 may include more or fewer light sources and photodetectors. In the example shown, light source 210 is configured to emit monochromatic light having a 960 nanometer (nm) wavelength, light source 212 is configured to emit monochromatic light having a 650 nm wavelength, light source 214 is configured to emit monochromatic light having a 460 nm wavelength, light source 216 is configured to emit monochromatic light having a 395 nm wavelength. Correspondingly, photodetector 220 is configured to detect an amount of light having a 960 nm wavelength, photodetector 222 is configured to detect an amount of light having a 650 nm wavelength, photodetector 224 is configured to detect an amount of light having a 460 nm wavelength, and photodetector 226 is configured to detect an amount of light having a 395 nm wavelength. Each light source 210-216 and photodetector 220-226 are configured as an emitter-detector pair, that is, light source 210 is configured to emit light in a direction so as to be captured and detected by photodetector 220. In some examples, each light source 210-216 may be collimated, and each photodetector 220-226 may have a predetermined field of view to limit detection of stray light, e.g., light not emitted from its corresponding paired light source. In some examples, each light source 210-216 and each photodetector 220-226 may be enclosed in the same and/or separate housings, for example, to limit detection of stray light. In some examples, photodetectors 220-226 may each be configured to be responsive to monochromatic light, e.g., at the wavelength of each photodetectors' corresponding light source 210-216.

In the example shown, filter 104 may be positioned between light sources 210-216 and photodetectors 220-226. In operation, aerosol and/or particulate matter captured by filter 104 may absorb and/or scatter light emitted by each of light sources 210-216 out of the field of view of corresponding photodetectors 220-226, thereby contributing to absorbance at the particular wavelengths of the light source/photo detector pairs. Photo detectors 220-226 capture an amount of light transmitted through filter 104 at the particular wavelength of each photodetector and may send an electrical signal corresponding to the amount of detected light, for example, to processor 236 or computing device 106. In some examples, a baseline measurement may be captured, for example, by positioning a filter with no aerosol or particular matter captured, e.g., a clean filter, between light sensors 210-216 and photodetectors 220-226 and capturing an amount of light at each of the particular wavelengths transmitted through the clean filter.

In the example shown, optical sensor 206 may detect the absorbance of filter 104 at a plurality of monochromatic wavelengths. In other words, optical sensor 206 may detect a plurality of absorbance values, e.g., data points, of the absorbance spectra of filter 104 at a plurality of discrete wavelengths. In the example shown, optical sensor 206 detects four absorbance values of the absorbance spectra of filter 104 at four individual wavelengths.

Figure 3:
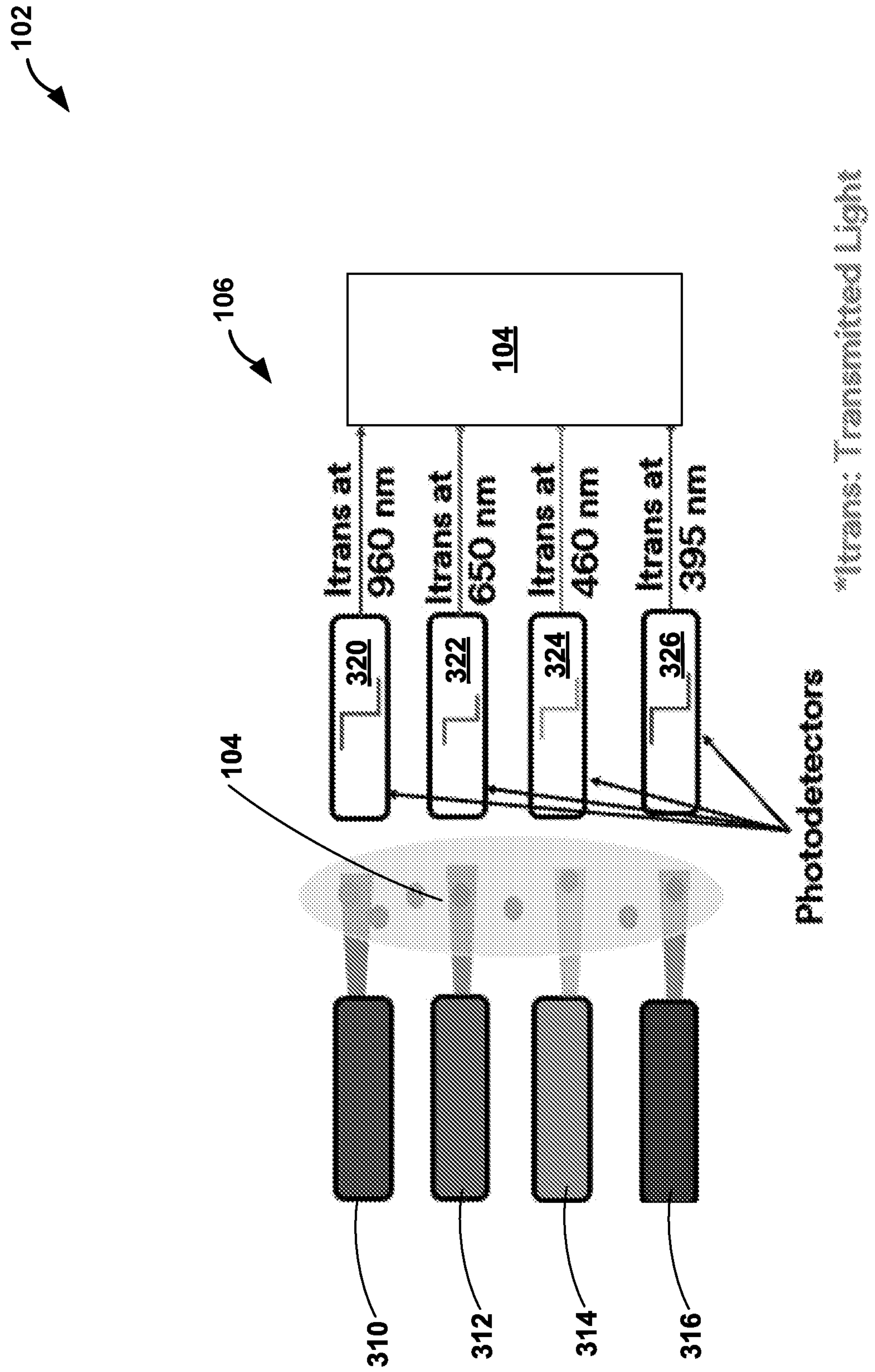
FIG. 3 is a conceptual diagram illustrating an example optical sensing system, in accordance with one or more techniques of this disclosure.

FIG. 3 is a conceptual diagram illustrating an example optical sensing system 102, in accordance with one or more techniques of this disclosure. In the example shown, optical sensing system 102 includes filter 104 and optical sensor 306.

In the example shown, optical sensor 306 includes a plurality of light sources 310-316, and a plurality of photodetectors 320-326. In some examples, optical sensor 306 may be substantially similar to optical sensor 206 except that the plurality of light sources and/or the plurality of photodetectors may differ. For example, light sources 310-316 may include a plurality of narrow-band light sources, e.g., “quasi-monochromatic” light sources, such as light emitting diodes (LEDs), where each LED is configured to emit light including electromagnetic radiation having a band of wavelengths and, in some examples, centered at a particular wavelength. In some examples, the LEDs of optical sensor 306 may emit light having any range of wavelengths, e.g., broadband light. Although four light sources and four photodetectors are shown, optical sensor 306 may include more or fewer light sources and photodetectors Similar to optical sensor 206, each light source 310-316 and photodetector 320-326 are configured as an emitter-detector pair. In some examples, the plurality of photodetectors of optical system 306 may be the same or substantially similar to the plurality of photodetectors of optical sensor 206. In some examples, photodetectors 320-326 may be configured to detect the band of wavelengths emitted by its corresponding light source.

Figure 4:
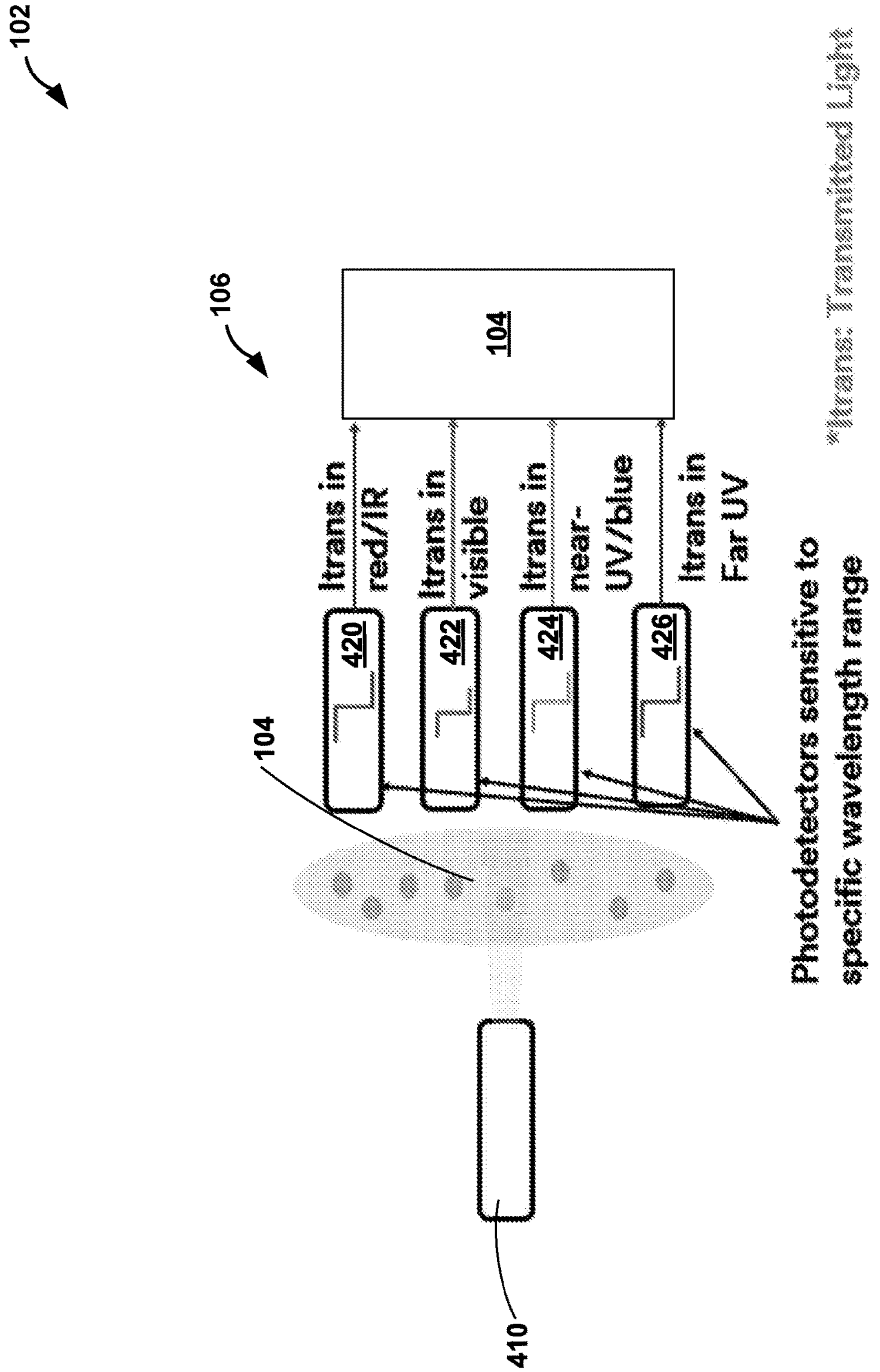
FIG. 4 is a conceptual diagram illustrating an example optical sensing system, in accordance with one or more techniques of this disclosure.

FIG. 4 is a conceptual diagram illustrating an example optical sensing system 102, in accordance with one or more techniques of this disclosure. In the example shown, optical sensing system 102 includes filter 104 and optical sensor 406.

In the example shown, optical sensor 406 includes a broadband light source 410, and a plurality of photodetectors 420-426. In some examples, optical sensor 406 may be substantially similar to optical sensors 206 and 306 except that the plurality of light sources is replaced with a broadband, e.g., “white light,” light source 410 and the plurality of photodetectors may differ. Although a single light source and four photodetectors are shown, optical sensor 406 may include more light sources and more or fewer photodetectors. In some examples, and similar to optical sensors 206 and 306, a plurality of light sources 410 may be configured as an emitter-detector pair with each of the plurality of photodetectors 320-326. In other examples, optical sensor 406 may include a single light source 410 configured to be viewable by each of the plurality of photodetectors 420-426.

In some examples, the plurality of photodetectors of optical system 406, e.g., photodetectors 420-426, may be the same or substantially similar to the plurality of photodetectors of optical systems 206 and/or 306. In some examples, photodetectors 420-426 may each be configured to detect a specific wavelength band. For example, photodetector 420 may be configured to detect an amount of light within a red/IR wavelength range, photodetector 422 may be configured to detect an amount of light within a visible wavelength range, photodetector 424 may be configured to detect an amount of light within a near-UV/blue wavelength range, and photodetector 426 may be configured to detect an amount of light within a far-UV wavelength range. In some examples, a red/IR wavelength range may include 650 nm to 850 nm wavelength light, 600 nm to 1000 nm wavelength light, or 600 nm to 2500 nm wavelength light. In some examples, a visible wavelength range may include 500 nm to 600 nm wavelength light, 450 nm to 650 nm wavelength light, or 380 nm to 780 nm wavelength light. In some examples, a near-UV/blue wavelength range may include 400 nm to 450 nm wavelength light, 380 nm to 480 nm wavelength light, or 350 nm to 480 nm wavelength light. In some examples, a far-UV wavelength range may include 350 nm to 400 nm wavelength light, 300 nm to 400 nm wavelength light, or 200 nm to 400 nm wavelength light. In some examples, the wavelength ranges of photodetectors 420-426 may overlap, and in other examples the wavelength ranges of photodetectors 420-426 may be configured such that they do not overlap.

Figure 5:
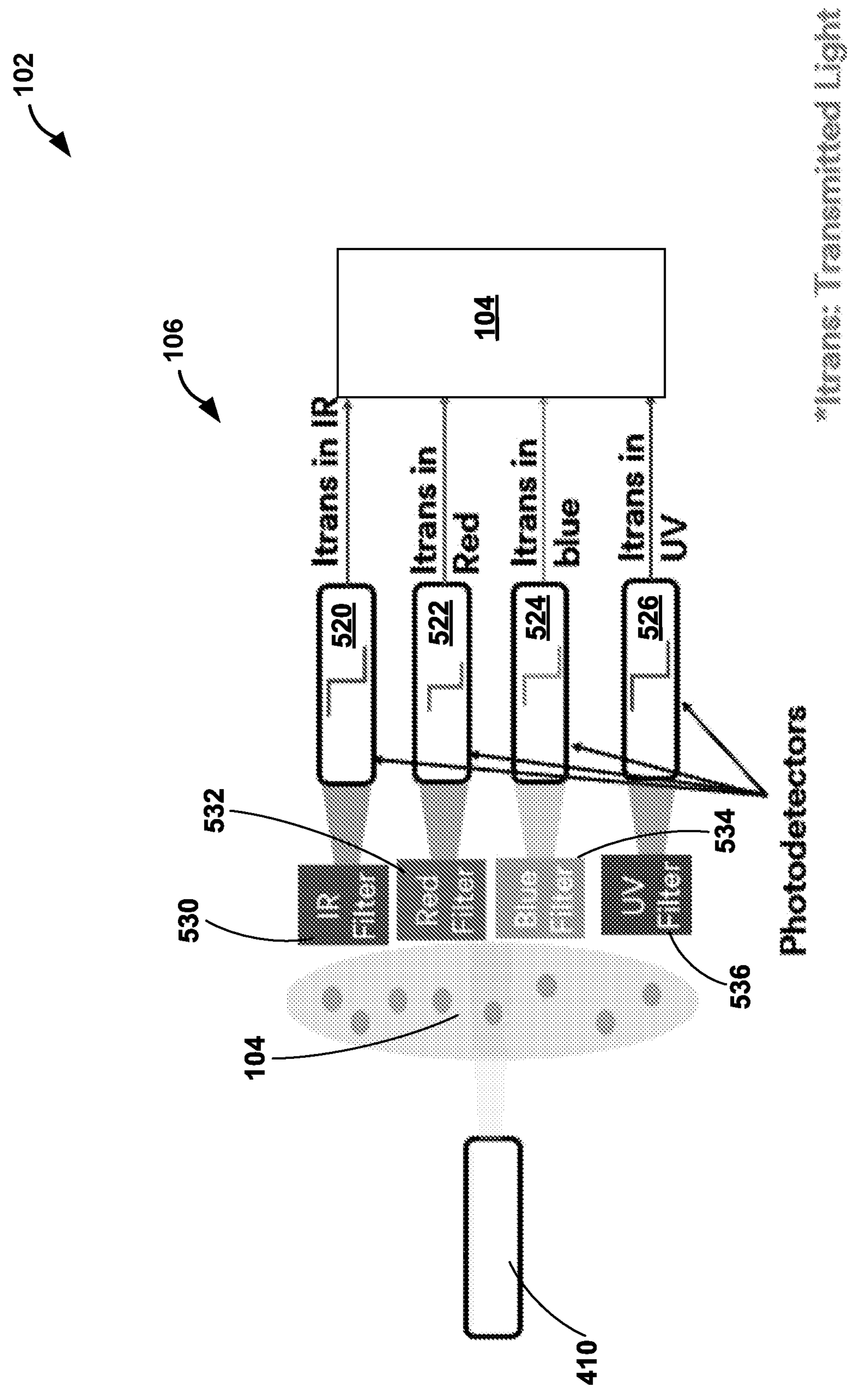
FIG. 5 is a conceptual diagram illustrating an example optical sensing system, in accordance with one or more techniques of this disclosure.

FIG. 5 is a conceptual diagram illustrating an example optical sensing system 102, in accordance with one or more techniques of this disclosure. In the example shown, optical sensing system 102 includes filter 104 and optical sensor 506.

In the example shown, optical sensor 506 includes a broadband light source 410, and a plurality of photodetectors 520-526. In some examples, optical sensor 506 may be substantially similar to optical sensor 406, except that optical sensor 506 may additionally include a plurality of optical filters, e.g., optical filters 530-536. In some examples, the plurality of photodetectors of optical system 506, e.g., photodetectors 520-526, may be the same or substantially similar to the plurality of photodetectors of optical systems 206, 306 and/or 406.

In some examples, the plurality of optical filters corresponds to each of the plurality of photodetectors. In some examples, optical filters 530-536 transmit light within particular wavelength ranges and block light outside of the particular wavelength range of each optical filter 530-536. For example, optical filter 520 may be configured to transmit an amount of light within an IR wavelength range, optical filter 522 may be configured to transmit an amount of light within a red wavelength range, optical filter 524 may be configured to transmit an amount of light within a blue wavelength range, and optical filter 526 may be configured to transmit an amount of light within a UV wavelength range. In some examples, an IR wavelength range may include 780 nm to 2500 nm wavelength light. In some examples, a red wavelength range may include 600 nm to 780 nm wavelength light. In some examples, a blue wavelength range may include 380 nm to 480 nm wavelength light. In some examples, a UV wavelength range may include 200 nm to 400 nm wavelength light. In some examples, the wavelength ranges of optical filter 420-426 may overlap, and in other examples the wavelength ranges of optical filter 420-426 may be configured such that they do not overlap.

Figure 6:
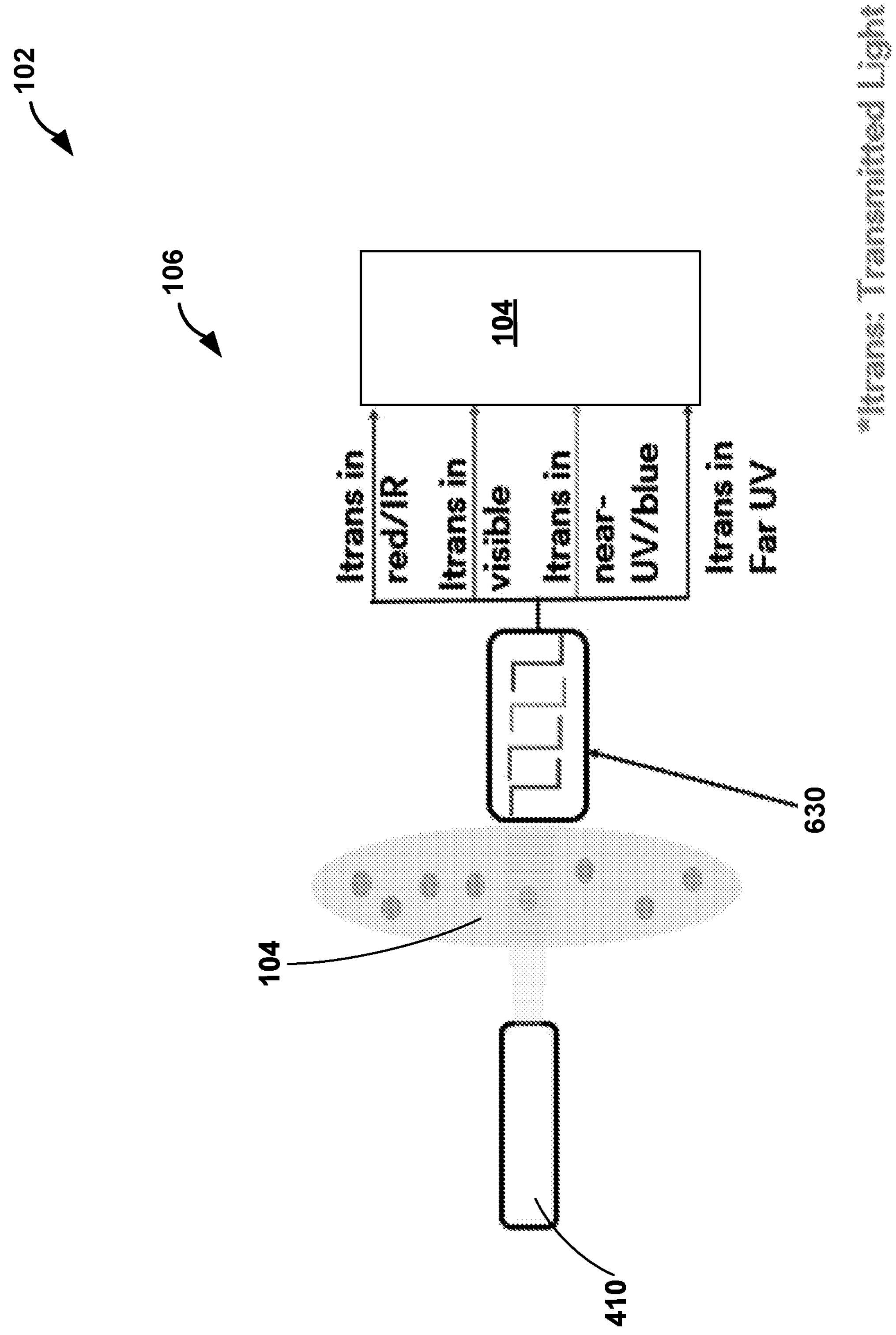
FIG. 6 is a conceptual diagram illustrating an example optical sensing system, in accordance with one or more techniques of this disclosure.

FIG. 6 is a conceptual diagram illustrating an example optical sensing system, in accordance with one or more techniques of this disclosure. In the example shown, optical sensing system 102 includes filter 104 and optical sensor 606.

In the example shown, optical sensor 606 includes a broadband light source 410, and an optical detection system 630. In some examples, optical sensor 506 may be substantially similar to optical sensors 206-506, except that optical sensor 506 may include optical detection system 630 rather than a plurality of photodetectors.

In some examples, optical detection system 630 may be a spectrophotometer configured to determine an amount of light at each wavelength within a range of wavelength range, e.g., optical detection system 630 may be configured detect a spectra of light captured by the system and output a spectral plot of the detected light. In some examples, optical detection system 630 may be configured to capture spectra having a wavelength range of 380 nm to 780 nm, 300 nm to 1100 nm, 200 nm to 2500 nm, or any wavelength range or wavelength range within those enumerated ranges.

In some examples, optical detection system 630 may transfer an electronic signal including spectral information, e.g., the entire detected spectra, to processor 236 or a computing system such as computing system 104. In other examples, optical detection system may "bin," e.g., sum or integrate, an amount of light in each of a plurality of subwavelength ranges and transfer an electronic signal including information corresponding to the amount of light in each of the plurality of spectral wavelength range "bins." In the example shown, optical detection system 630 communicates the amount of light in each of a red/IR wavelength range, a visible wavelength range, a near-UV/blue wavelength range, and a far-UV wavelength range to computing system 104.

Figure 7:
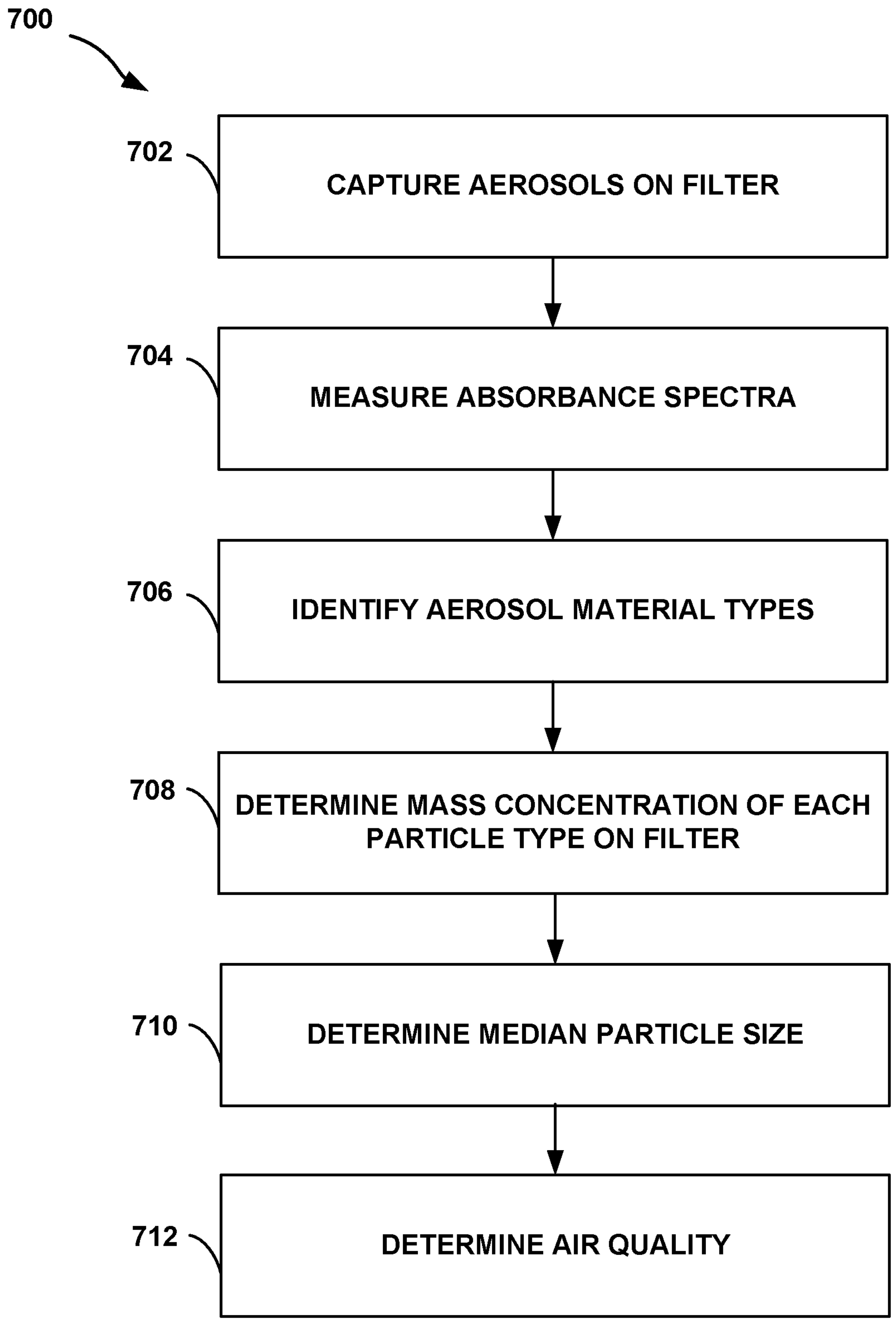
FIG. 7 is a flowchart of an example method of determining air quality, in accordance with one or more techniques of this disclosure.

FIG. 7 is a flowchart of an example method 700 of determining air quality, in accordance with one or more techniques of this disclosure. The method 700 is described below with reference to the FIGS. 1-6. The example method 700 may be performed, for example, by a computing device, such as computing device 106 executing the steps of the method.

A filter, for example filter 104, may capture particles (702). In some examples, the filter may be an air filter of air movement system 108 and located within volume 110. Particles may include aerosol particles and/or material, dust, or any particles that may be moved by air movement system. Filter 104 may capture a plurality of particles of a plurality of material types.

An absorbance spectra of the filter and captured particles may be measured, for example, via optical sensing system 102 (704). The measured absorbance spectra may be a plurality of absorbance values corresponding to a plurality of discrete wavelengths or wavelength ranges, e.g., two or more absorbance values corresponding to two or more wavelengths or wavelength ranges, as described above with respect to FIGS. 2-6. In some examples, a baseline absorbance spectra of a "clean" filter, e.g., filter 104 without any captured particles, may be measured, and a captured particle absorbance spectra may be determined via subtraction of the baseline filter absorbance spectra from the measured absorbance spectra of the filter and captured particles. In some examples, a baseline filter absorbance spectra and/or spectrum may be measured using optical sensing system 102. In other examples, a baseline filter absorbance spectra may be stored, for example, in memory 224 and/or 234. In some examples, the baseline filter absorbance spectra may vary depending on the filter type, filter media, and/or filter material included in the filter.

One or more materials, and/or one or more material types, of the captured particles may be identified based on the measured absorbance spectra and/or the captured particle absorbance spectra (706). For example, features of the measured absorbance spectra and/or captured particle absorbance spectra may be compared to features of one or more known absorbance spectra of one or more known materials. Identification of particle material, and/or material type, is further illustrated and described below with respect to FIGS. 8-11.

A mass accumulation of each identified captured particle material and/or material type of the captured particles may be identified based on the measured absorbance spectra and/or the captured particle absorbance spectra, and the identified captured particle materials (708). For example, the measured absorbance spectra may be compared with an absorbance versus mass curve, table, or function for each identified captured particle material, as further illustrated and described below with respect to FIGS. 12-13.

A median particle size of each identified captured particle material and/or material type of the captured particles may be determined based on the measured absorbance spectra and/or the captured particle absorbance spectra, and the identified materials and/or material types of the particles (710). For example, an absorption angstrom exponent of each identified captured particle material may be determined based on the measured absorbance spectra, and the median particle size of each identified captured particle material may be determined based on the corresponding determined absorption angstrom exponent, as further illustrated and described below with respect to FIGS. 15-18.

An air quality may be determined based on mass loading and median particle size (712). For example, an air quality score, e.g., an air quality metric, may be calculated based on a mass accumulation on the filter and the median particle size. In some examples, an air quality score may be determined following the Environmental Protection Agency (EPA) air quality scale for PM2.5 and PM10 particulate matter. Determination of an air quality score is further illustrated and described below with respect to FIG. 19.

Figure 8:
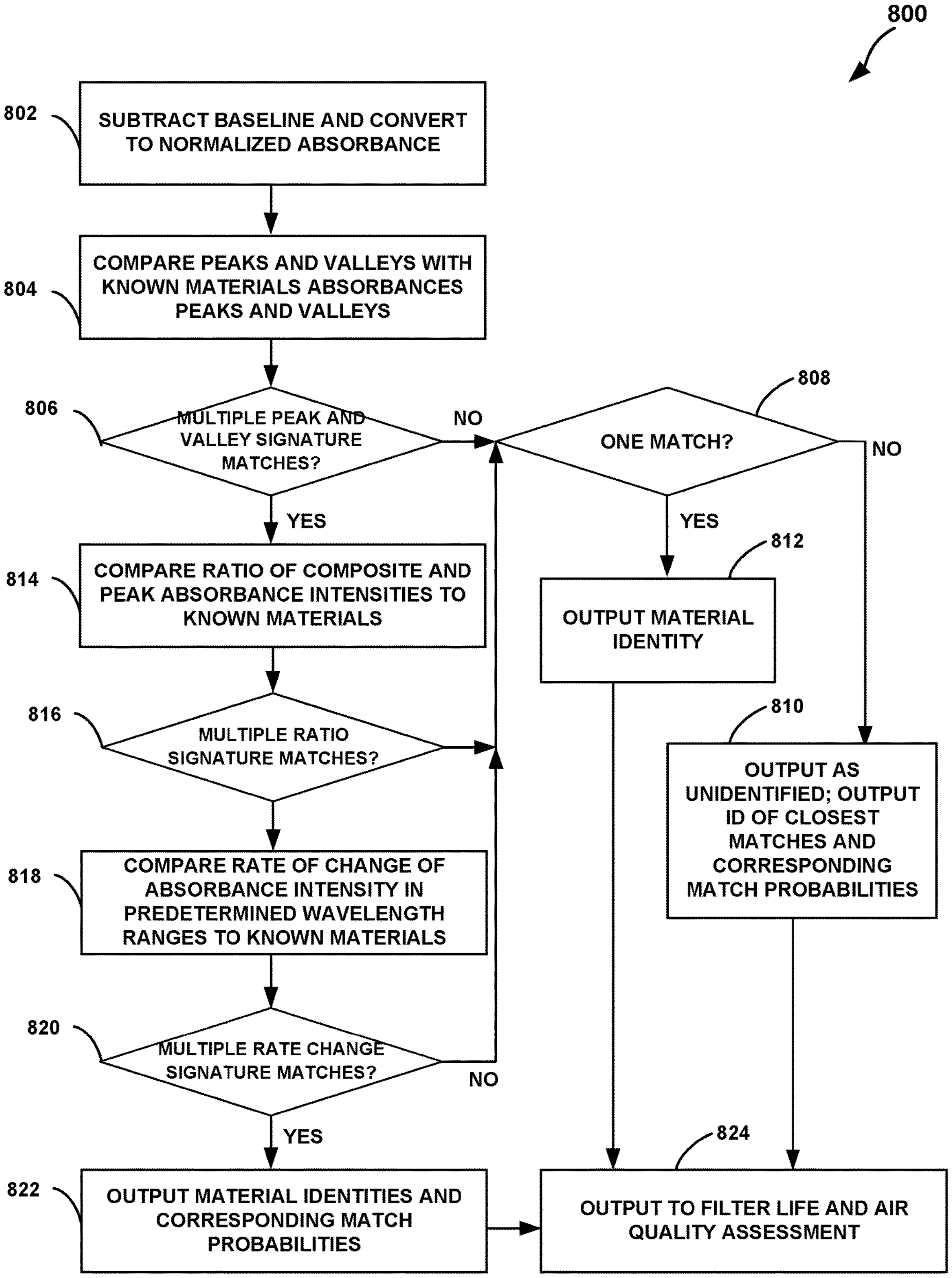
FIG. 8 is a flowchart of an example method of determining materials and/or material types of captured particles, in accordance with one or more techniques of this disclosure.

FIG. 8 is a flowchart of an example method 800 of determining materials and/or material types of captured particles, in accordance with one or more techniques of this disclosure. The method 800 is described below with reference to FIGS. 1-7 and FIGS. 9-11. The example method 800 may correspond to method step 706 described above, and may be performed, for example, by a computing device, such as computing device 106 executing the steps of the method.

Figure 9:
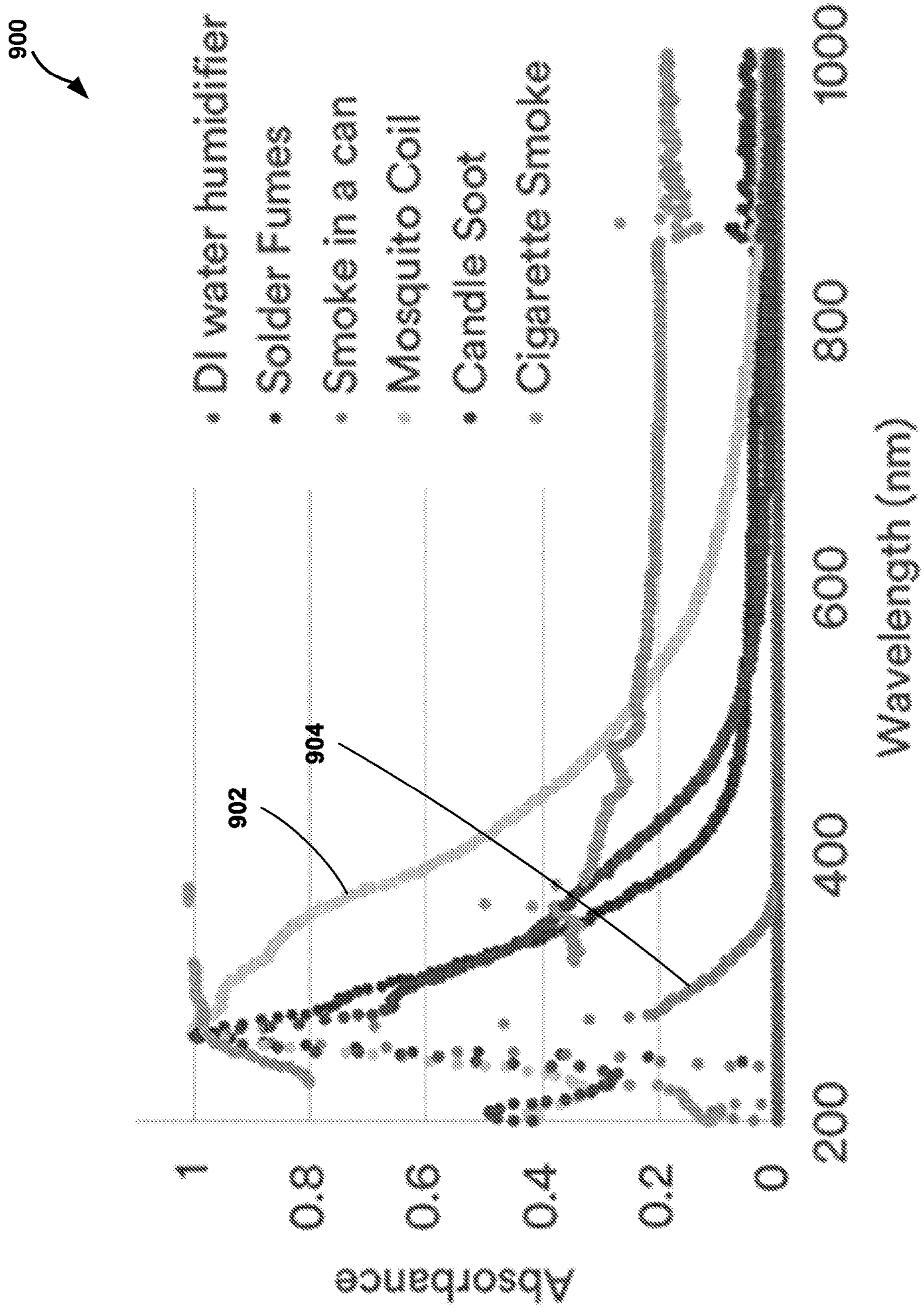
FIG. 9 is a plot of example normalized known absorbance spectra of a plurality of known aerosol materials, in accordance with one or more techniques of this disclosure.
Figure 10:
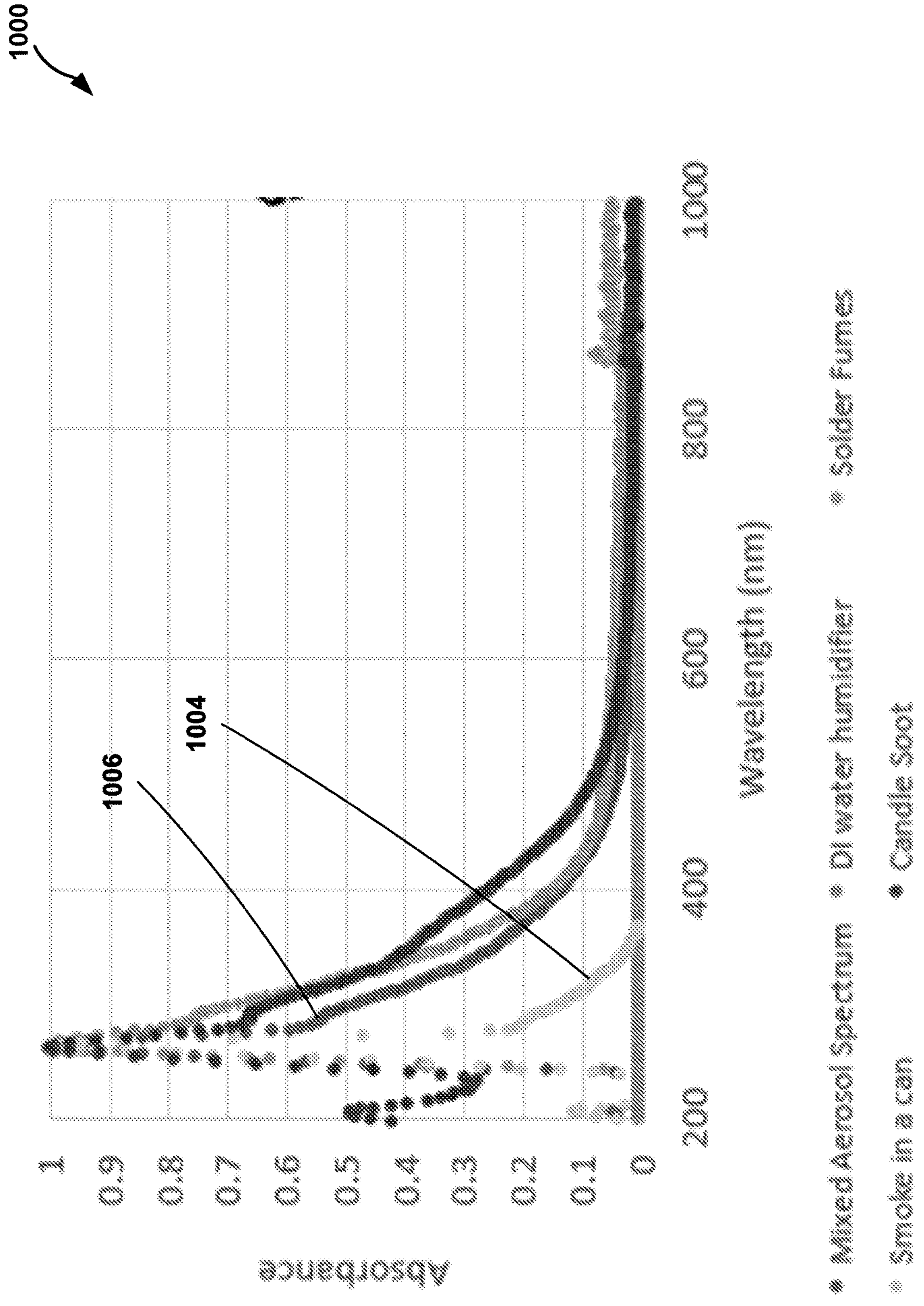
FIG. 10 is a plot of example normalized captured and known absorbance spectra of a plurality of known aerosol materials, in accordance with one or more techniques of this disclosure.

A normalized captured particle absorbance spectra may be determined, for example, via subtraction of a baseline absorbance spectra of the filter, e.g., as described above at method step 704, and normalization based on the resulting maximum absorbance intensity (802). An example of normalized known particle absorbance spectra of a plurality of known aerosol material types including distinguishing features are illustrated in FIG. 9. A normalized captured particle absorbance spectra may be compared with normalized known particle absorbance spectra of a plurality of known aerosol material types. An example of a normalized captured particle absorbance spectra 1006 is illustrated along with example normalized known particle absorbance spectra of a plurality of known aerosol material types in FIG. 10.

Features of the normalized captured particle absorbance spectra 1006 may be determined and compared with corresponding features of normalized known absorbance spectra of one or more known materials (804). For example, peaks and valleys of the normalized absorbance spectra may be determined, e.g., via visual evaluation, one or more peak and/or valley finding procedures or algorithms, or via any appropriate method. In addition, feature attributes of the determined features may be determined. For example, wavelength locations, shape, width, height, number, and the like, of the peaks and valleys may be determined. For example, the normalized known absorbance spectra 902, e.g., mosquito coil spectra 902 illustrated in FIG. 9, has a peak approximately at 240 nm with an approximate full-width at half maximum (FWHM, e.g. half maximum being 0.5 for the normalized spectra) of approximately 200 nm, a valley approximately at 230 nm with an approximate valley value of 0.3, and a second peak at approximately 205 nm with a peak value of approximately 0.5. These feature attributes, among other peak and valley features and feature attributes, may form a peak and valley signature of mosquito coil spectra 902. The smoke in a can spectra 904 has a peak at or near 240 nm, a FWHM of approximately 20 nm, a valley approximately at 230 nm with a valley value of approximately 0.0, and a second peak at approximately 205 nm with a peak value of approximately 0.1. A signature may refer to one or more features and/or one or more feature attributes, and multiple signatures may be formed and/or determined based on an absorbance spectra and/or normalized absorbance spectra. Corresponding peak and valley signatures, e.g. signatures including comparable absorbance spectral features and/or absorbance spectral feature attributes, of mosquito coil spectra 902 and smoke in a can spectra 904 may be distinguishable via their respective signature features and feature attributes. In the example above, the differing FWHMs, valley wavelength locations, valley values, and second peak values may differentiate mosquito coil spectra 902 and smoke in a can spectra 904.

One or more corresponding peak and valley signatures of the normalized captured particle absorbance spectra may be compared to the peak and valley signatures of one or more known materials and/or material types (804), and whether there are peak and valley signature matches to multiple known materials and/or material types may be determined (806). In some examples, a peak and valley signature match probability for one or more known materials and/or material types to the normalized captured particle absorbance spectra may be determined, and a determination of a match may be based on the peak and valley signature match probability being greater than a predetermined threshold.

If there are not multiple peak and valley signature matches, whether there is one or more peak and valley signature matches with a single known material and/or material type may be determined (808). If there is not a peak and valley match with a single known material and/or material type, the measured absorbance spectra and/or normalized captured particle absorbance spectra may be determined to be unidentified (810). In some examples, the identities of one or more known particle material types having a peak and valley signature match probability that is greater than a second, e.g. lower, predetermined threshold may be determined and output along with the corresponding peak and valley signature match probability (810). If there is a single known material and/or material type peak and valley signature match at (808), the identity of the matching material may be determined and output along with, in some examples, its corresponding peak and valley signature match probability (812).

Figure 11:
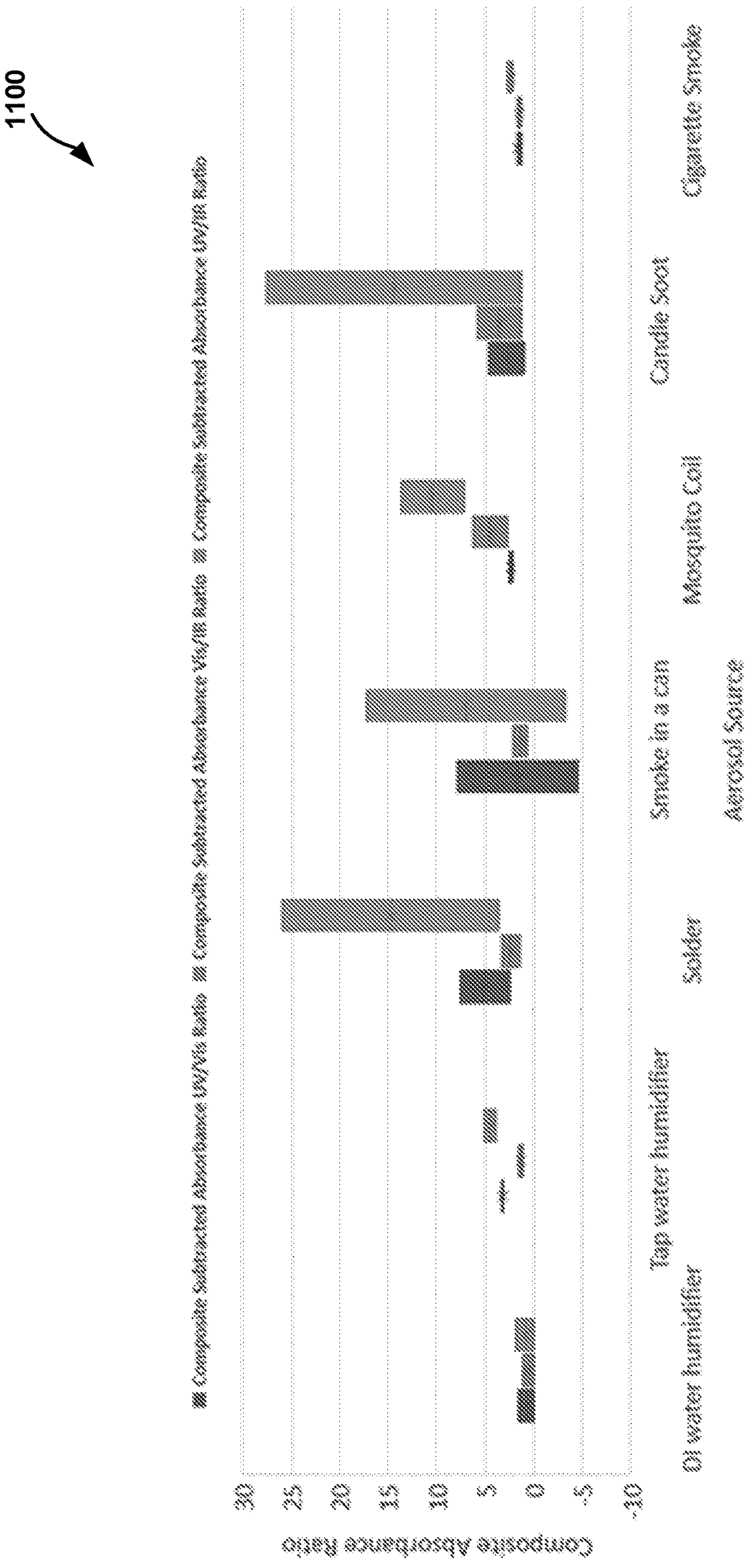
FIG. 11 is a plot of example composite ratio signatures of a plurality of known aerosol materials, in accordance with one or more techniques of this disclosure.

Referring back to (806), if there are multiple known materials and/or material types determined to have a peak and valley signature match with the normalized captured particle absorbance spectra, one or more corresponding composite ratio signatures of the normalized captured particle absorbance spectra may be compared to composite ratio signatures of one or more known materials and/or material types (814). For example, a composite of an absorbance spectra, e.g., the normalized captured particle absorbance spectra and/or the normalized known absorbance of one or more known materials and/or material types, over one or more wavelength ranges may be determined. In some examples, a composite may be a sum or integration of the absorbance spectra values over the wavelength range. In some examples, a composite in each of a UV wavelength range, a visible wavelength range, and an IR wavelength range may be determined. In some examples, one or more composite ratio features may be determined, for example, a UV/visible composite ratio feature, a visible/IR composite ratio feature, and a UV/IR composite ratio feature may be determined. In some examples, a composite ratio signature may be determined, e.g., formed, based on one or more composite ratio features. FIG. 11 illustrates composite ratio signatures 1100 for several known materials and/or material types, e.g., each signature including composite ratio features for UV/visible, visible/IR, and UV/IR. In some examples, a composite ratio signature match probability for one or more known materials and/or material types to the normalized captured particle absorbance spectra may be determined, and a determination of a composite ratio signature match may be based on the composite ratio signature match probability being greater than a predetermined threshold.

Figure 12:
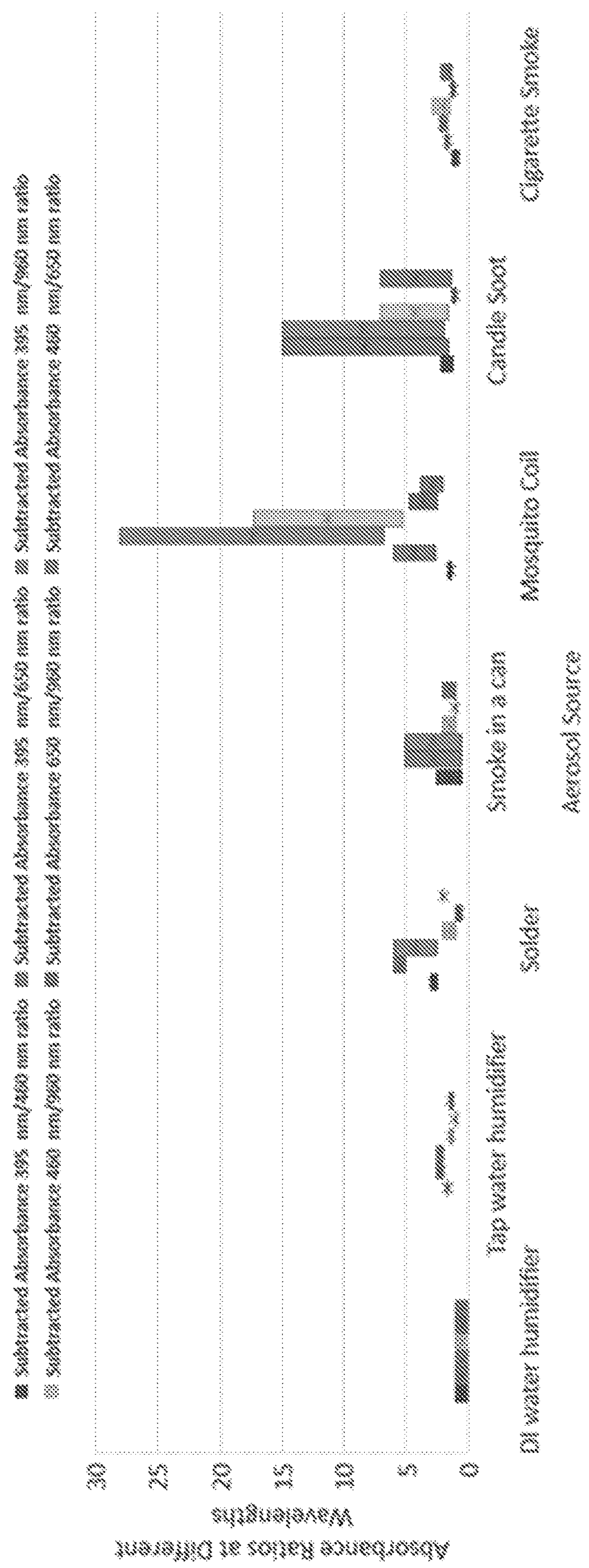
FIG. 12 is a plot of example peak ratio signatures of a plurality of known aerosol materials, in accordance with one or more techniques of this disclosure.

Similarly, one or more corresponding peak ratio signatures of the normalized captured particle absorbance spectra may be compared to peak ratio signatures of one or more known materials and/or material types (814). For example one or more peaks of an absorbance spectra, e.g., the normalized captured particle absorbance spectra and/or the normalized known absorbance of one or more known materials and/or material types, within one or more wavelength ranges may be determined, e.g., via visual inspection or any appropriate peak finding algorithm, function, method, or procedure. In some examples, one or more peak absorbance values in each of a UV wavelength range, a visible wavelength range, and an IR wavelength range may be determined. In some examples, one or more peak ratio features may be determined, for example, a UV/visible peak ratio feature, a visible/IR peak ratio feature, and a UV/IR peak ratio feature may be determined. In some examples, a peak ratio signature may be determined, e.g., formed, based on one or more peak ratio features. Additionally, and/or alternatively, the absorbance value at one or more specific wavelengths of an absorbance spectra, e.g., wavelengths of typical absorbance peaks for one or more materials, may be used. In other words, the absorbance values at predetermined wavelengths of an absorbance spectra may be used as "peak" values for the purpose of determining or forming peak ratio features and peak ratio signatures. FIG. 12 illustrates peak ratio signatures 1200 for several known materials and/or material types based on absorbance values at specific wavelengths, namely at 395 nm, 460 nm, 650 nm, and 960 nm in the example shown. In some examples, a peak ratio signature match probability for one or more known materials and/or material types to the normalized captured particle absorbance spectra may be determined, and a determination of a peak ratio signature match may be based on the peak ratio signature match probability being greater than a predetermined threshold.

Whether the normalized captured particle absorbance spectra include matches to composite ratio signatures and/or peak ratio signatures of multiple known materials and/or material types may be determined (816).

If there are not composite and/or peak ratio signature matches for multiple known materials and/or material types, whether there is one or more composite and/or peak ratio signature matches with a single known material and/or material type may be determined (808). If there is not a composite and/or peak ratio signature match with a single known material and/or material type, the measured absorbance spectra and/or normalized captured particle absorbance spectra may be determined to be unidentified (810). In some examples, the identities of one or more known particle material types having a composite and/or peak ratio signature match probability that is greater than a second, e.g.

lower, predetermined threshold may be determined and output along with the corresponding composite and/or peak ratio signature match probability (810). If there is a single known material and/or material type composite and/or peak ratio signature match at (808), the identity of the matching material may be determined and output along with, in some examples, its corresponding composite and/or peak ratio signature match probability (812).

Figure 13:
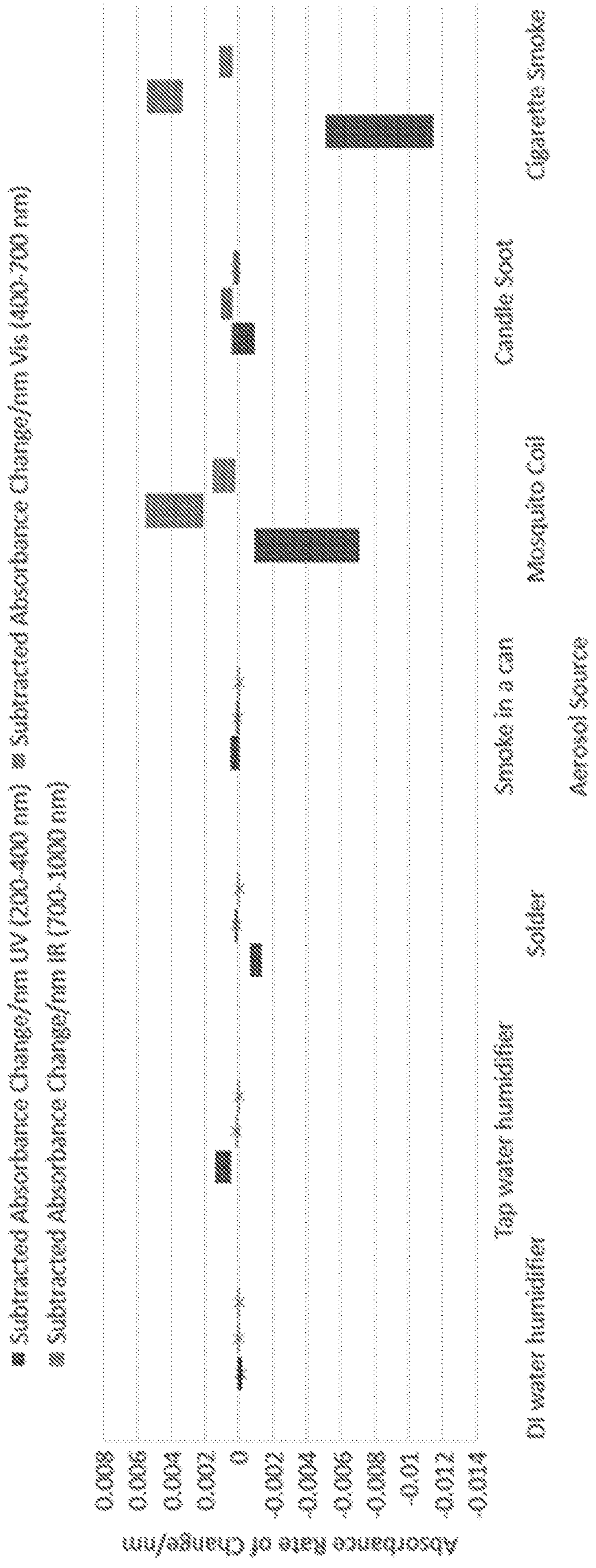
FIG. 13 is a plot of example rate of change signatures of a plurality of known aerosol materials, in accordance with one or more techniques of this disclosure.

Referring back to (816), if there are multiple known materials and/or material types determined to have a composite and/or peak ratio signature match with the normalized captured particle absorbance spectra, one or more corresponding rate of change signatures of the normalized captured particle absorbance spectra may be compared to rate of change signatures of one or more known materials and/or material types (818). For example a rate of change of an absorbance spectra, e.g., the normalized captured particle absorbance spectra and/or the normalized known absorbance of one or more known materials and/or material types, over one or more wavelength ranges may be determined. In some examples, a rate of change may be a rise over run calculation, a derivative, an average derivative, and the like of the absorbance spectra values over the wavelength range. In some examples, a rate of change in each of a 200 nm to 400 nm wavelength range, a 400 nm to 700 nm wavelength range, and 700 nm to 1000 nm wavelength range may be determined. In some examples, a rate of change signature may be determined, e.g., formed, based on the rate of change of absorbance over one or more wavelength regions. FIG. 13 illustrates rate of change signatures 1300 for several known materials and/or material types. In some examples, a rate of change signature match probability for one or more known materials and/or material types to the normalized captured particle absorbance spectra may be determined, and a determination of a rate of change signature match may be based on the rate of change signature match probability being greater than a predetermined threshold.

Whether the normalized captured particle absorbance spectra include matches to rate of change signatures of multiple known materials and/or material types may be determined (820).

If there are not rate of change signature matches for multiple known material and/or materials types, whether there is one or more rate of change signature matches with a single known material and/or material type may be determined (808). If there is not a rate of change signature match with a single known material and/or material type, the measured absorbance spectra and/or normalized captured particle absorbance spectra may be determined to be unidentified (810). In some examples, the identities of one or more known particle material types having a rate of change signature match probability that is greater than a second, e.g. lower, predetermined threshold may be determined and output along with the corresponding rate of change signature match probability (810). If there is a single known material and/or material type rate of change signature match at (808), the identity of the matching material may be determined and output along with, in some examples, its corresponding rate of change signature match probability (812).

Referring back to (820), if there are multiple known materials and/or material types determined to have a rate of change signature match with the normalized captured particle absorbance spectra, the identities of the matching known materials and/or material types may be output along with, in some examples, the corresponding rate of change signature match probability, composite and/or peak ratio signature match probability, and peak and valley signature match probability (822). The identities and signature match probabilities may be output to an air quality assessment method (824).

Figure 14:
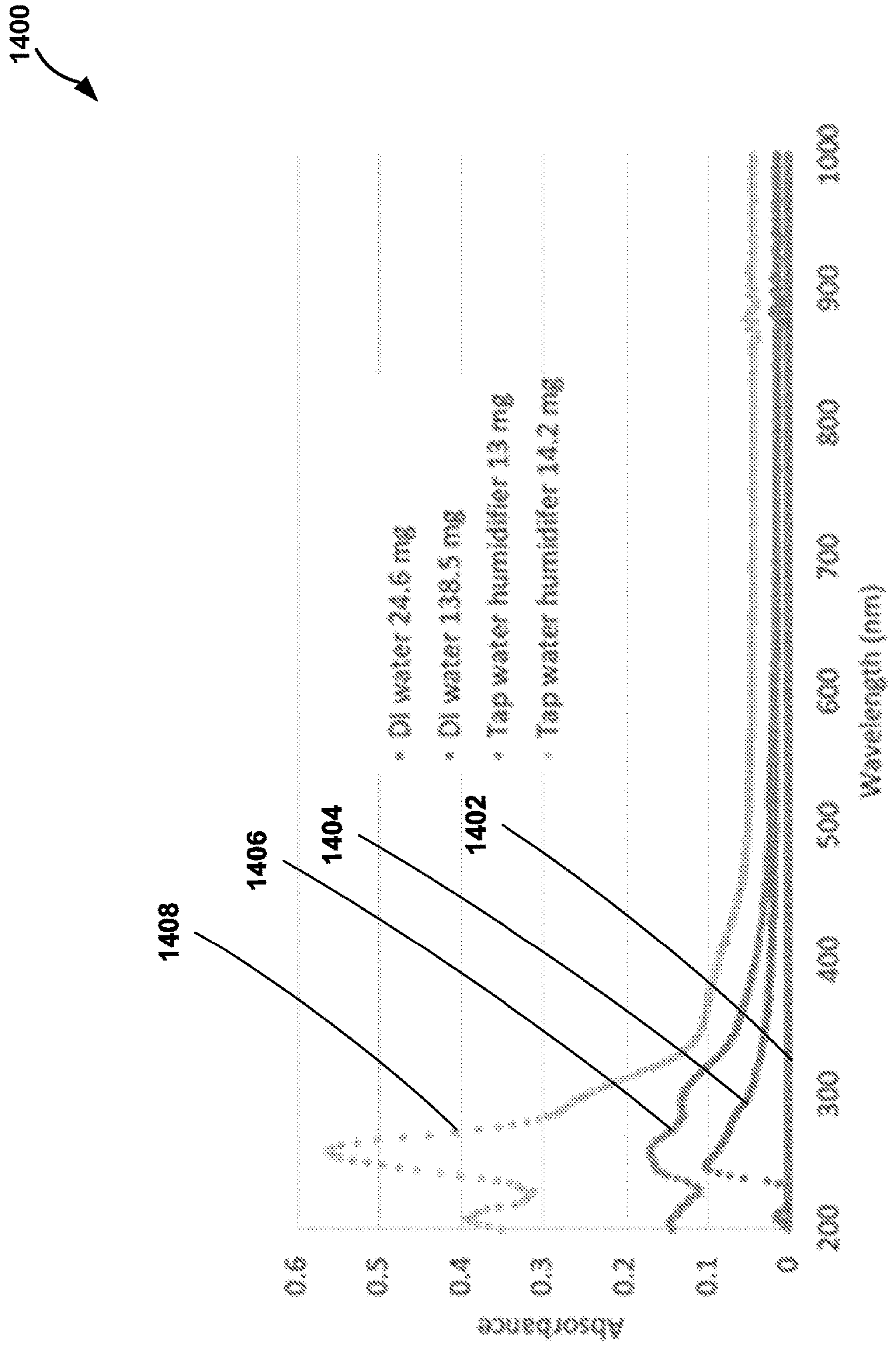
FIG. 14 is a plot of example known absorbance spectra of a plurality of known aerosol materials, in accordance with one or more techniques of this disclosure.

FIG. 14 is a plot 1400 of example known absorbance spectra of a plurality of known aerosol materials, in accordance with one or more techniques of this disclosure. In the example shown, the plot 1400 includes captured particle absorbance spectra of 24.6 milligrams (mg) of deionized (DI) water 1402, 138.5 mg of DI water 1404, 13 mg of tap water 1406, and 14.2 mg of tap water 1408. FIG. 14 illustrates the insensitivity of the disclosed methods to humidity and water vapor, thereby reducing uncertainty in the measurements and increasing the reliability and accuracy of the measurements. In the example shown, the shift between the two DI water absorbance spectra 1402 and 1404 due to amounts of DI water that differ by more than a factor of 5, e.g., 1404 includes an over 450% increase in DI water mass from 1402, is approximately 0.1 at the peak near 240 nm. By comparison, the shift between the tap water absorbance spectra 1406 and 1408 due to amounts of tap water, that differ by a factor of 1.06, e.g., 1408 includes an approximately 6% increase in tap water mass from 1406, is approximately 0.4 at the peak near 240 nm. The comparison illustrates that the absorbance spectra measurement is insensitive to scattering due to water vapor, and is sensitive to particulate matter, for example, salts contained in tap water.

Figure 15:
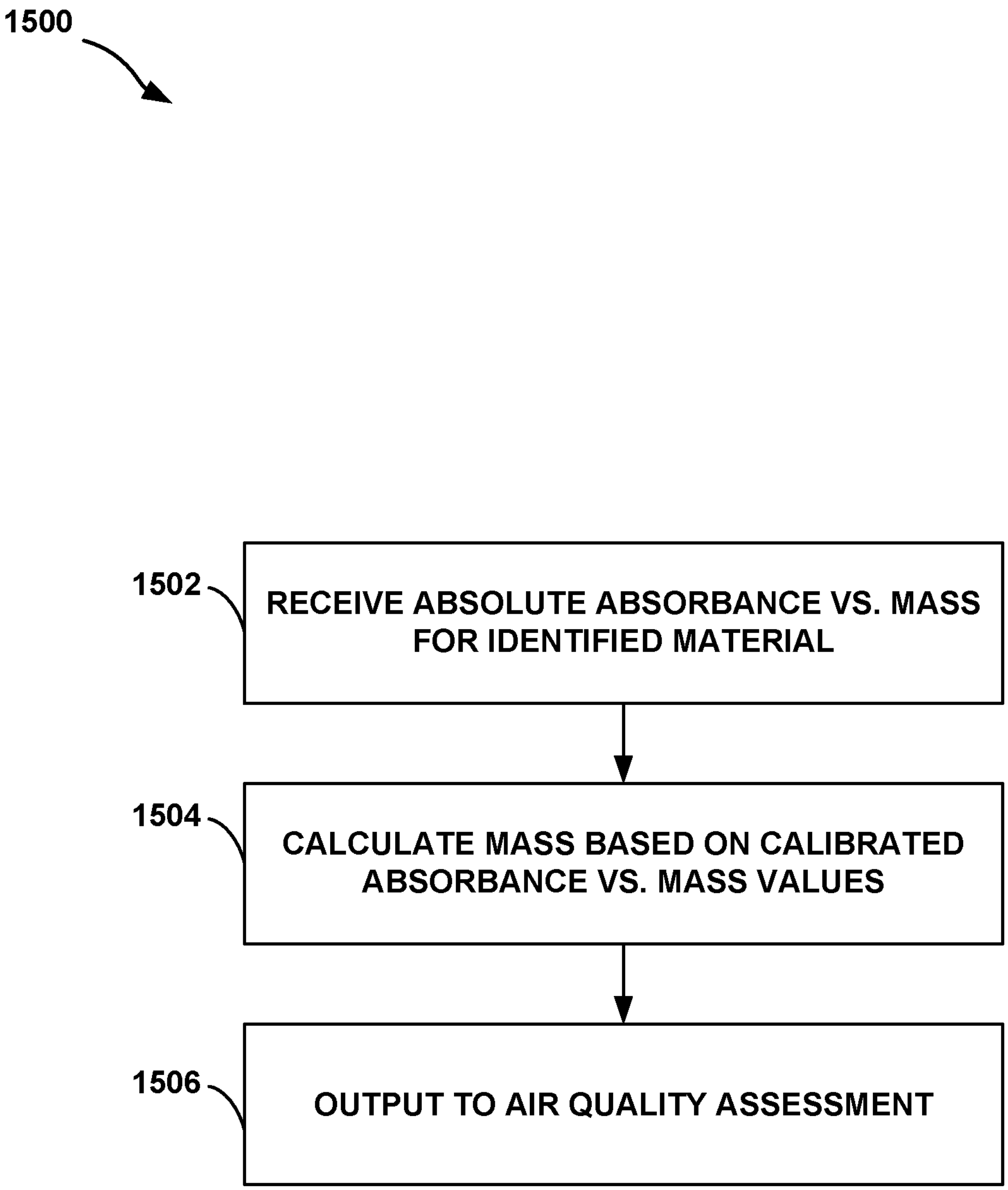
FIG. 15 is a flowchart of an example method of determining a mass loading of a filter, in accordance with one or more techniques of this disclosure.

FIG. 15 is a flowchart of an example method 1500 of determining a mass loading of a filter, in accordance with one or more techniques of this disclosure. The example method 1500 may correspond to method step 708 described above, and may be performed, for example, by a computing device, such as computing device 106 executing the steps of the method.

A pre-calibrated absorbance versus mass curve, table, algorithm, or function for each of the identified known materials and/or material types, e.g., identified via method 800 above, may be determined (1502). For example, the absorbance at each wavelength in a spectra range, a composite absorbance of one or more wavelength ranges, and/or a total composite absorbance over the entire wavelength range for a plurality of masses and or densities may be received for one or more known materials and or material types. A mass of each identified known material and/or material type captured on the filter may be determined based on a comparison of the measured absorbance spectra, captured particle absorbance spectra, and/or normalized captured particle absorbance spectra to the received absorbance vs. mass curve of each identified known material and/or material type (1504). The determined mass of each identified known material and/or material type may be output to an air quality assessment method (1506).

Figure 16:
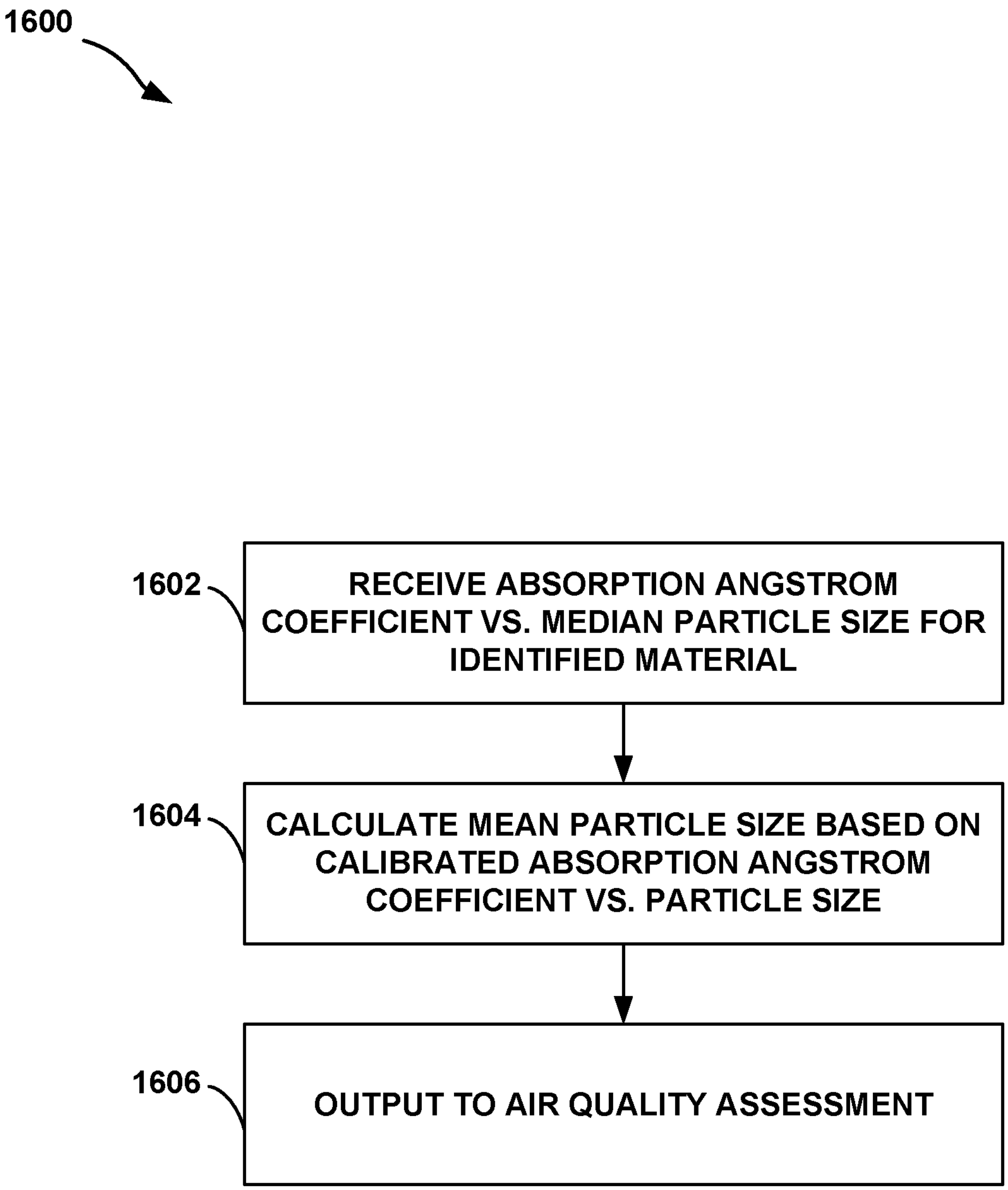
FIG. 16 is a flowchart of an example method of determining median particle size, in accordance with one or more techniques of this disclosure.

FIG. 16 is a flowchart of an example method 1600 of determining median particle size, in accordance with one or more techniques of this disclosure. The example method 1600 may correspond to method step 710 described above, and may be performed, for example, by a computing device, such as computing device 106 executing the steps of the method. The method 1600 is described below with reference to FIGS. 1-9, and 17-18. The example method 1600 may correspond to method step 706 described above, and may be performed, for example, by a computing device, such as computing device 106 executing the steps of the method.

An absorption angstrom coefficient versus median particle size curve, table, algorithm, or function for each of the identified known materials and/or material types, e.g., identified via method 800 above, may be determined (1602). An absorption angstrom coefficient may define a rate of change of absorbance in a wavelength region, e.g., a visible wavelength region, an IR wavelength region, or any other wavelength region. For example, an absorption angstrom coefficient may be calculated via equation 1 below:

$$\alpha = -\frac{\log\frac{\mathcal{T}_{\lambda_1}}{\mathcal{T}_{\lambda_2}}}{\log\frac{\lambda_1}{\lambda_2}} \tag{1}$$

where a is the absorption angstrom coefficient, □□ and □□ are two different wavelengths, □□ is the optical depth at the respective wavelengths and is related to absorbance A via □=A ln 10, where ln is the natural logarithm.

Figure 17:
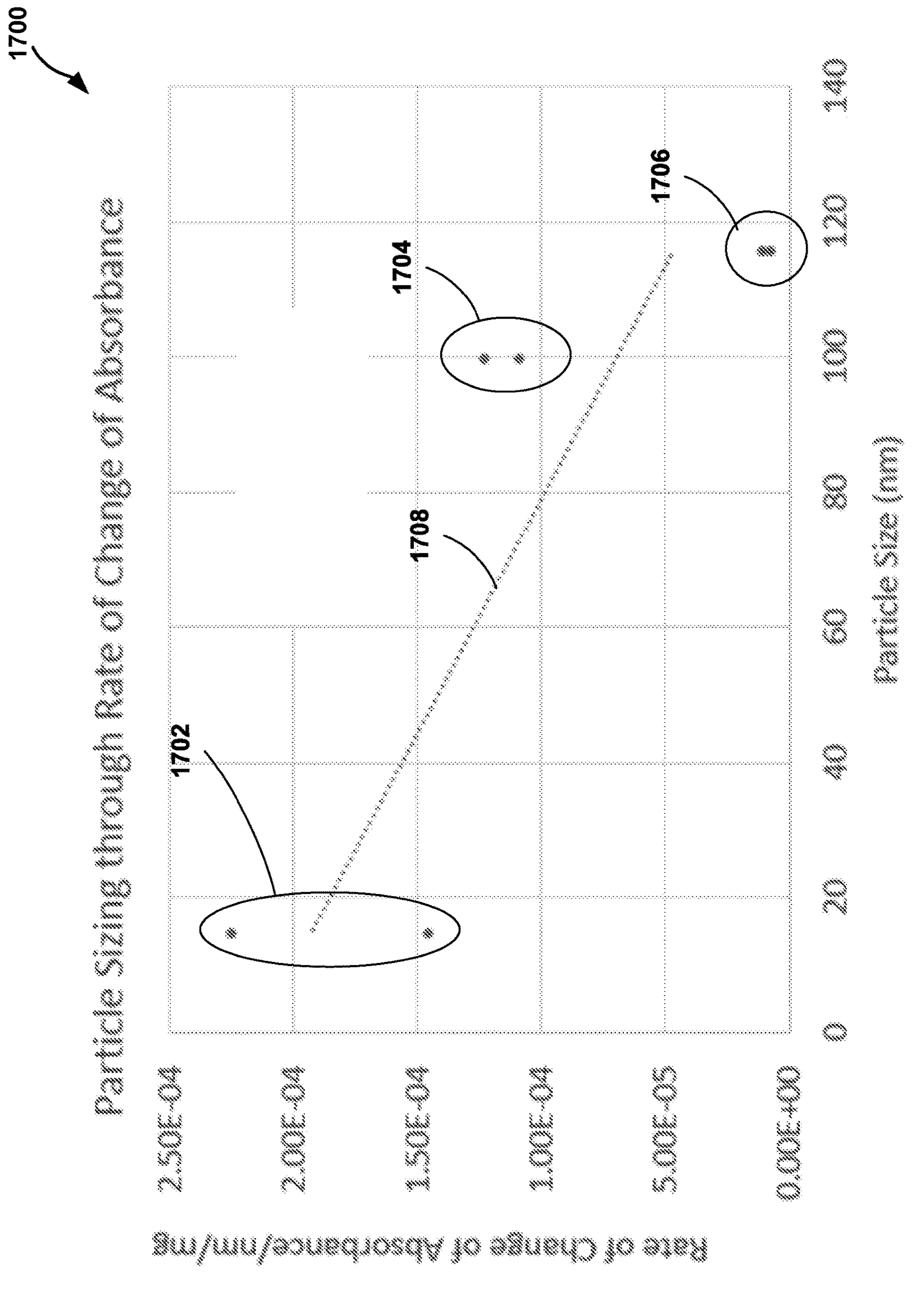
FIG. 17 illustrates an example plot of a rate of change of absorbance as a function of particle size, in accordance with one or more techniques of this disclosure.
Figure 18A:
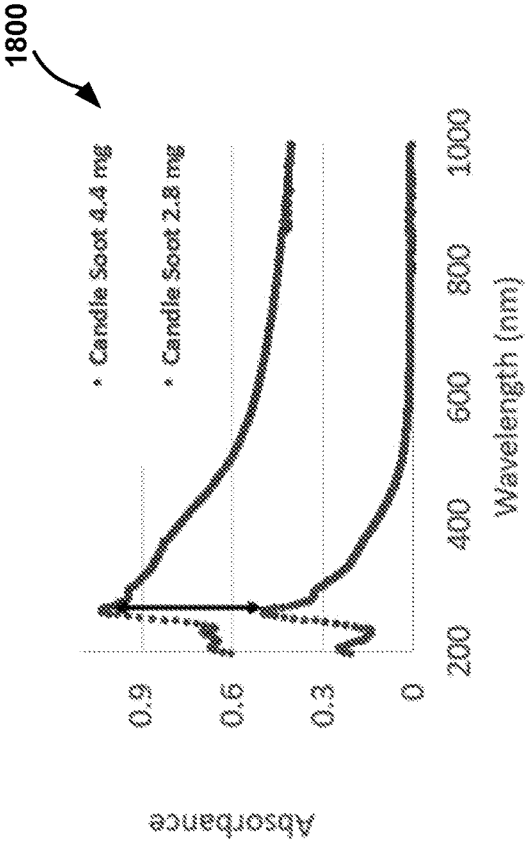
FIGS. 18A-18D are example plots illustrating a change of captured particle absorbance spectra of ultrafine particles for two different mass loadings, in accordance with one or more techniques of this disclosure.
Figure 18B:
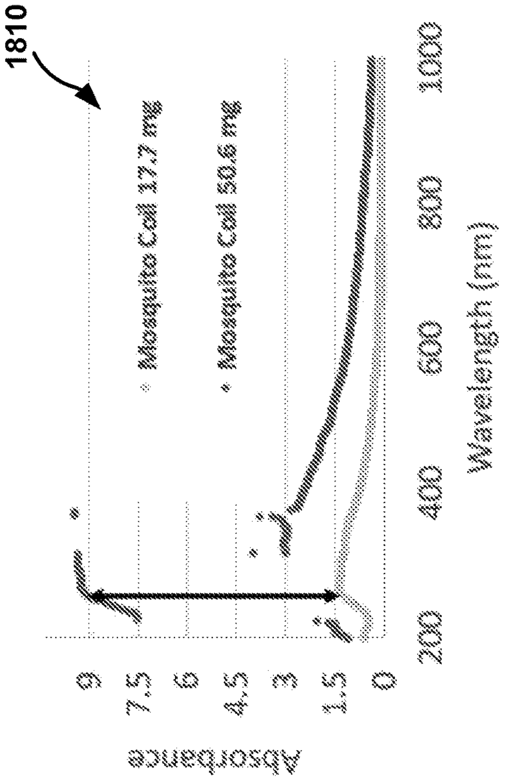
Figure 18C:
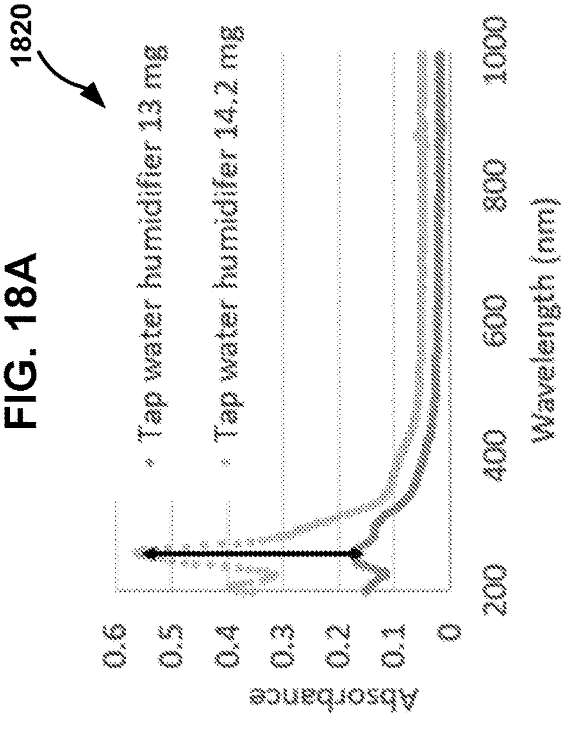
Figure 18D:
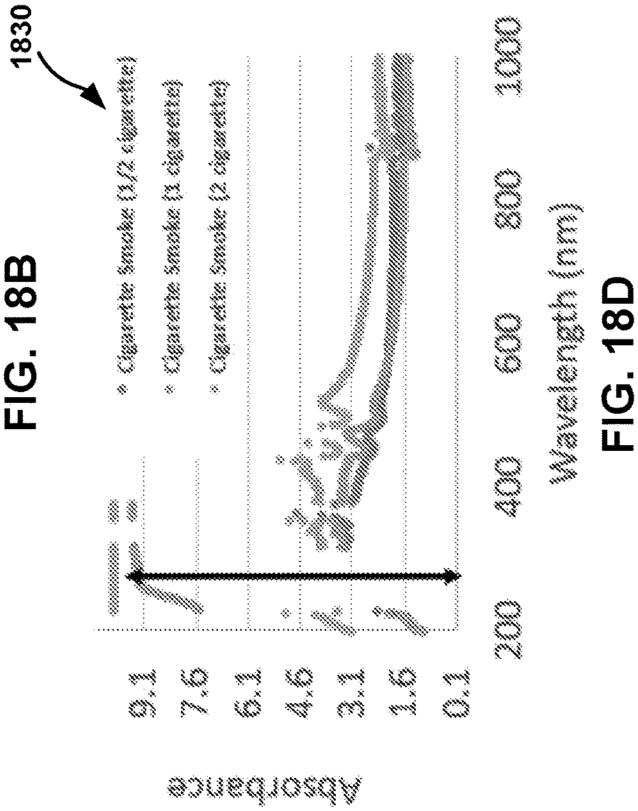

In some examples, the absorbance of an aerosol particle material decreases with increasing wavelength at an approximately exponential rate and may be inversely proportional to the median particle size of the aerosol material. For example, a higher decrease rate within the wavelength range may correspond to a smaller median particle size, e.g., a smaller median particle diameter. FIG. 17 illustrates an example plot 1700 of a rate of change of absorbance as a function of particle size, in accordance with one or more techniques of this disclosure. In the example shown, the rate of change of absorbance for two different mass loadings of candle soot 1702, mosquito coil 1704, and tap water 1706 are illustrated. Fit line 1708 illustrates the inverse relationship between rate of change of absorbance and median particle size.

A median particle size of each identified known material and/or material type captured on the filter may be determined based on a comparison of the absorption angstrom coefficient of the measure absorbance spectra in one or more wavelength ranges to the known absorption angstrom coefficient of one or more known materials and/or material types in the corresponding wavelength ranges (1604). The determined median particle size of each identified known material and/or material type may be output to an air quality assessment method (1606).

FIGS. 18A-18D are example plots 1800-1830 illustrating a change of captured particle absorbance spectra of ultrafine particles for two different mass loadings, in accordance with one or more techniques of this disclosure. In the examples shown, each of plots 1800-1830 illustrate a significant change in measured absorbance spectra for two different mass loadings of ultrafine particles on the filter, indicating detectability of ultrafine particles via absorbance spectra, e.g., particles with median diameters of less than 300 nm and/or less than 100 nm. For example, plot 1800 illustrates a significant change in measured absorbance spectra for two different mass loadings of an ultrafine particle having a median diameter less than 100 nm, e.g., candle soot. Plot 1810 illustrates a significant change in measured absorbance spectra for two different mass loadings of an ultrafine particle having a median diameter substantially near 100 nm, e.g., mosquito coil. Plot 1820 illustrates a significant change in measured absorbance spectra for two different mass loadings of an ultrafine particle having a median diameter substantially less than 300 nm, e.g., tap water. Plot 1830 illustrates a significant change in measured absorbance spectra for two different mass loadings of an ultrafine particle having a median diameter substantially near 300 nm, e.g., cigarette smoke.

Figure 19:
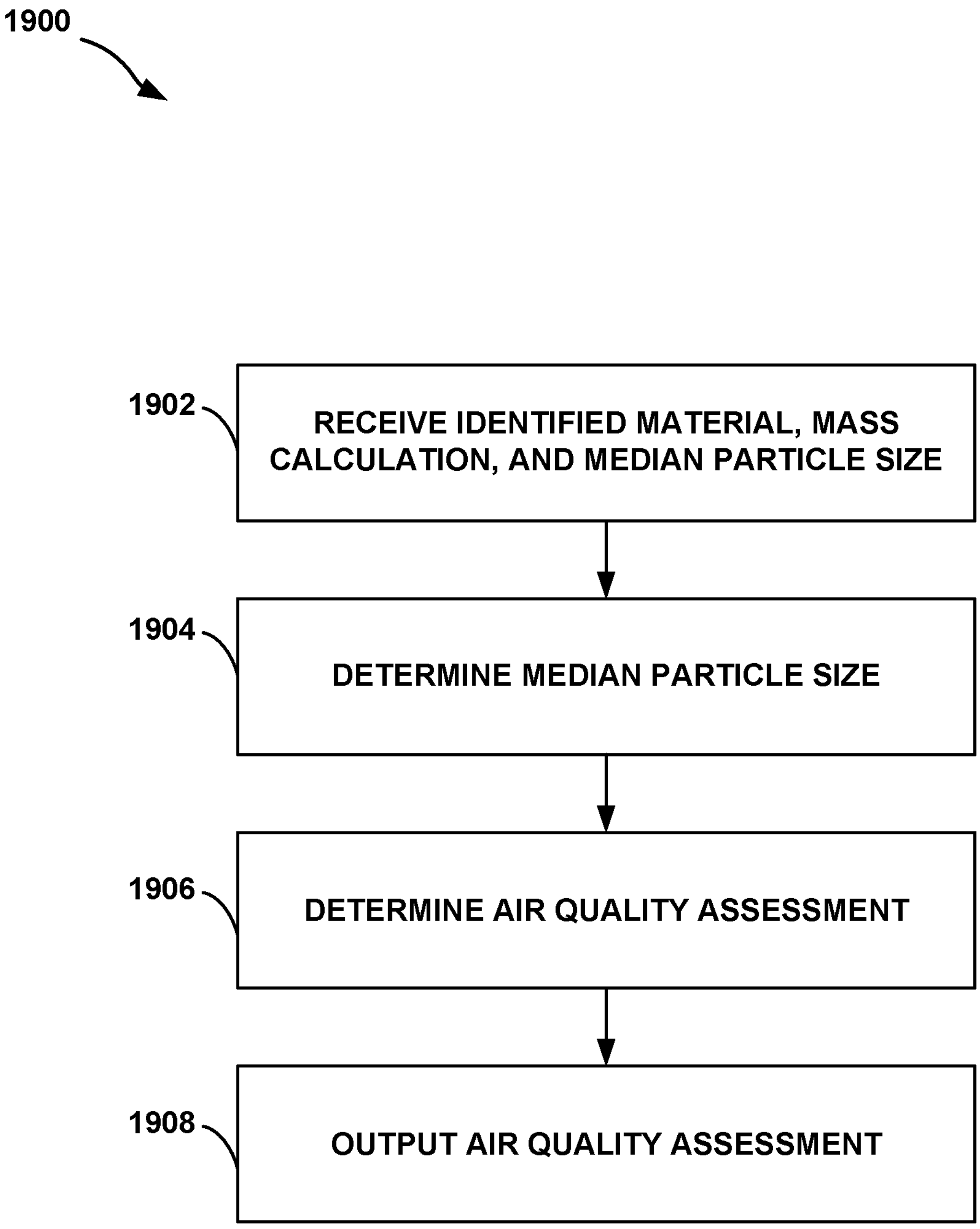
FIG. 19 is a flowchart of an example method of determining air quality, in accordance with one or more techniques of this disclosure.

FIG. 19 is a flowchart of an example method 1900 of determining air quality, in accordance with one or more techniques of this disclosure. The example method 1900 may correspond to method step 712 described above, and may be performed, for example, by a computing device, such as computing device 106 executing the steps of the method.

One or more identified captured particle materials and/or material types along with corresponding mass loadings and median particle sizes, e.g., via method steps 706, 708, and 710 and/or respectively corresponding methods 800, 1500, and 1600, may be received (1902). For example, median particle size and mass loadings may be determined via equations (2)-(4) below in conjunction with, or as part of, methods 1500 and 1600 (1904).

Particle Medium Diameter:

$$\text{Angstrom Absorption Exponent} * \left(\frac{\Delta\text{Angstrom Absorption Exponent}}{\Delta\text{Particle Median Diameter}}\right) \tag{2}$$

$$\text{Mass Accumulated per unit time: } \frac{\text{Mass Accumulated}}{60\text{ s}} \tag{3}$$

Mass Concentration:

$$\frac{\text{Mass Accumulated per unit time}}{\text{Flowrate through the filter } (\textit{HVAC} \text{ Airflow or } \textit{RAP CADR})} \tag{4}$$

An air quality score may be determined following the EPA air quality scale for PM2.5 and PM10 particulate matter based on the median particle sizes and mass loadings of the material types on the filter (1906). The air quality score may be output, e.g., via processing circuitry 216 to memory 224, output 220, and/or display 218 (1908).

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

The following examples may illustrate one or more aspects of the disclosure:

Example 1. A method of determining air quality, the method comprising: identifying one or more aerosol particle types based on an absorbance spectra of aerosol particles captured on a filter; determining a mass concentration of each of the one or more aerosol particle types based on the absorbance spectra and the aerosol particle type; detecting a median particle size of each of the one or more aerosol particle types based on a rate of change of the absorbance spectra and the aerosol particle type; and determining an air quality metric based on the identified one or more aerosol particle types, the determined mass concentration of each of the one or more aerosol particle types, and the determined median particle size of each of the one or more aerosol particle types.

Example 2. The method of claim 1, wherein identifying one or more aerosol particle types further comprises: subtracting a baseline filter absorbance spectra from the absorbance spectra to determine an aerosol absorbance spectra; and comparing peaks and valleys of the aerosol absorbance spectra to predetermined absorbance peaks and valleys corresponding to known aerosol particle types.

Example 3. The method of claim 2, wherein identifying one or more aerosol particle types further comprises: compositing the aerosol absorbance spectra in one or more wavelength bands; and comparing the composited aerosol absorbance spectra to predetermined composite absorbance spectra corresponding to known aerosol particle types.

Example 4. The method of claim 3, wherein identifying one or more aerosol particle types further comprises: dividing the aerosol absorbance spectra at one or more first wavelength by the aerosol absorbance spectra at one or more second wavelength, the one or more first wavelength different from the one or more second wavelength, to determine one or more aerosol absorbance ratio; and comparing the one or more aerosol absorbance ratio to one or more predetermined aerosol absorbance ratios corresponding to known aerosol particle types.

Example 5. The method of claim 4, wherein identifying one or more aerosol particle types further comprises: determining a plurality of rates of change of the aerosol absorbance spectra corresponding to a plurality of wavelength bands; and comparing at least one of the determined plurality of rates of change of the aerosol absorbance spectra to at least one predetermined rate of change of aerosol absorbance spectra corresponding to known aerosol particle types.

Example 6. The method of claim 1, wherein determining a mass concentration of each of the one or more aerosol particle types further comprises: subtracting a baseline filter absorbance spectra from the absorbance spectra to determine an aerosol absorbance spectra; determining an absolute absorbance for each of the one or more aerosol particle types; and comparing the absolute absorbance of each of the one or more aerosol particle types to a predetermined absorbance per mass curve of each of the one or more aerosol particle types.

Example 7. The method of claim 1, wherein determining a median particle size of each of the one or more aerosol particle types further comprises: subtracting a baseline filter absorbance spectra from the absorbance spectra to determine an aerosol absorbance spectra; determining an absorbance angstrom exponent for each of the one or more aerosol particle types; and comparing the absorbance angstrom exponent of each of the one or more aerosol particle types to a predetermined absorbance angstrom exponent per particle size curve of each of the one or more aerosol particle types.

Example 8. The method of claim 5, wherein the rate of change of the absorbance spectra is indicative of aerosol particles of less than 300 nm diameter.

Example 9. The method of claim 5, wherein the rate of change of the absorbance spectra is indicative of ultrafine aerosol particles of less than 100 nm diameter.

Example 10. The method of claim 6, wherein determining an air quality further comprises: subtracting a baseline filter absorbance spectra from the absorbance spectra to determine an aerosol absorbance spectra, wherein the baseline filter absorbance spectra is based on at least one of a filter type and a filter media; determining an absolute absorbance for each of the one or more aerosol particle types; determining a mass accumulation rate based on the absolute absorbance of each of the one or more aerosol particle types and the mass concentration of each of the one or more aerosol particle types; and determining an air quality score based on the mass accumulation rate and a flowrate through the filter.

Example 11. The method of claim 1, wherein the absorbance spectra of the aerosol particles captured on the filter is within a wavelength band encompassing ultraviolet (UV), visible, and near infrared (NIR) wavelengths.

Example 12. The method of claim 11, wherein the UV, visible, and NIR wavelengths are within a wavelength range from 150 nanometers (nm) to 3300 nm.

Example 13. The method of claim 11, wherein the absorbance spectra of the aerosol particles captured on the filter is measured via a measurement system comprising: one or more light source; and one or more light detector.

Example 14. The method of claim 13, wherein the one or more light source comprises a laser source at least at each of a 395 nm, a 460 nm, a 650 nm, and a 960 nm wavelength, and wherein the one or more light detector comprises a light detector responsive to light at least at each of the 395 nm, the 460 nm, the 650 nm, and the 960 nm wavelength.

Example 15. The method of claim 13, wherein the one or more light source comprises a light emitting diode (LED) source at least at each of a 395 nm, a 460 nm, a 650 nm, and a 960 nm wavelength, and wherein the one or more light detector comprises a light detector responsive to light at least at each of the 395 nm, the 460 nm, the 650 nm, and the 960 nm wavelength.

Example 16. The method of claim 13, wherein the one or more light source emits polychromatic light within the UV, visible, and NIR wavelength range, and wherein the one or more light detector comprises one or more light filters at least at each of a UV wavelength range, a visible blue wavelength range, a visible red wavelength range, and a NIR wavelength range.

Example 17. The method of claim 13, wherein the one or more light source emits polychromatic light within the UV, visible, and NIR wavelength range, and wherein the one or more light detector comprises a spectrometer configured to determine an amount of light as a function of wavelength within the UV, visible, and NIR wavelength range.

Example 18. The method of claim 1, further comprising displaying the air quality metric.

Example 19. A computer-readable storage medium comprising instructions that configure one or more programmable processors to: identify one or more aerosol particle types based on an absorbance spectra of aerosol particles captured on a filter; determine a mass concentration of each of the one or more aerosol particle types based on the absorbance spectra and the aerosol particle type; detect a median particle size of each of the one or more aerosol particle types based on a rate of change of the absorbance spectra and the aerosol particle type; determine an air quality metric based on the identified one or more aerosol particle types, the determined mass concentration of each of the one or more aerosol particle types, and the determined median particle size of each of the one or more aerosol particle types; and display the air quality metric.

Example 20. The computer-readable storage medium of claim 19 further comprising instructions that configure the one or more programmable processors to: subtract a baseline filter absorbance spectra from the absorbance spectra to determine an aerosol absorbance spectra, wherein the baseline filter absorbance spectra is based on at least one of a filter type and a filter media; determine an absorbance angstrom exponent for each of the one or more aerosol particle types; and compare the absorbance angstrom exponent of each of the one or more aerosol particle types to a predetermined absorbance angstrom exponent per particle size curve of each of the one or more aerosol particle types.

Example 21. The computer-readable storage medium of claim 19 further comprising instructions that configure the one or more programmable processors to: determine an absolute absorbance for each of the one or more aerosol particle types; and determine the mass concentration based on the absolute absorbance of each of the one or more aerosol particle types and a predetermined absorbance per mass curve of each of the one or more aerosol particle types; determine an absolute absorbance for each of the one or more aerosol particle types; determine a mass accumulation rate based on the absolute absorbance of each of the one or more aerosol particle types and the mass concentration of each of the one or more aerosol particle types; and determining an air quality score based on the mass accumulation rate and a flowrate through the filter.

Example 22. The computer-readable storage medium of claim 21, wherein the absorbance spectra of the aerosol particles captured on the filter is within a wavelength band encompassing ultraviolet (UV), visible, and near infrared (NIR) wavelengths.

Example 23. A system comprising: one or more light source; one or more detector; at least one computer-readable storage medium comprising instructions that configure one or more programmable processors to: identify one or more aerosol particle types based on an absorbance spectra of aerosol particles captured on a filter; determine a mass concentration of each of the one or more aerosol particle types based on the absorbance spectra and the aerosol particle type; detect a median particle size of each of the one or more aerosol particle types based on a rate of change of the absorbance spectra and the aerosol particle type; and determine an air quality metric based on the identified one or more aerosol particle types, the determined mass concentration of each of the one or more aerosol particle types, and the determined median particle size of each of the one or more aerosol particle types; and display the air quality metric.

Various examples have been described. These and other examples are within the scope of the following claims.

What is claimed is:

1. A method of determining air quality, the method comprising:

identifying one or more aerosol particle types based on an absorbance spectra of aerosol particles captured on a filter;

determining a mass concentration of each of the one or more aerosol particle types based on the absorbance spectra and the aerosol particle type;

detecting a median particle size of each of the one or more aerosol particle types based on a rate of change of the absorbance spectra and the aerosol particle type; and determining an air quality metric based on the identified one or more aerosol particle types, the determined mass concentration of each of the one or more aerosol particle types, and the determined median particle size of each of the one or more aerosol particle types.

2. The method of claim 1, wherein identifying one or more aerosol particle types further comprises:

subtracting a baseline filter absorbance spectra from the absorbance spectra to determine an aerosol absorbance spectra; and comparing peaks and valleys of the aerosol absorbance spectra to predetermined absorbance peaks and valleys corresponding to known aerosol particle types.

3. The method of claim 2, wherein identifying one or more aerosol particle types further comprises:

compositing the aerosol absorbance spectra in one or more wavelength bands; and comparing the composited aerosol absorbance spectra to predetermined composite absorbance spectra corresponding to known aerosol particle types.

4. The method of claim 3, wherein identifying one or more aerosol particle types further comprises:

dividing the aerosol absorbance spectra at one or more first wavelength by the aerosol absorbance spectra at one or more second wavelength, the one or more first wavelength different from the one or more second wavelength, to determine one or more aerosol absorbance ratio; and comparing the one or more aerosol absorbance ratio to one or more predetermined aerosol absorbance ratios corresponding to known aerosol particle types.

5. The method of claim 4, wherein identifying one or more aerosol particle types further comprises:

determining a plurality of rates of change of the aerosol absorbance spectra corresponding to a plurality of wavelength bands; and comparing at least one of the determined plurality of rates of change of the aerosol absorbance spectra to at least one predetermined rate of change of aerosol absorbance spectra corresponding to known aerosol particle types.

6. The method of claim 1, wherein determining the mass concentration of each of the one or more aerosol particle types further comprises:

subtracting a baseline filter absorbance spectra from the absorbance spectra to determine an aerosol absorbance spectra;

determining an absolute absorbance for each of the one or more aerosol particle types; and comparing the absolute absorbance of each of the one or more aerosol particle types to a predetermined absorbance per mass curve of each of the one or more aerosol particle types.

7. The method of claim 1, wherein determining the median particle size of each of the one or more aerosol particle types further comprises:

subtracting a baseline filter absorbance spectra from the absorbance spectra to determine an aerosol absorbance spectra;

determining an absorbance angstrom exponent for each of the one or more aerosol particle types; and comparing the absorbance angstrom exponent of each of the one or more aerosol particle types to a predetermined absorbance angstrom exponent per particle size curve of each of the one or more aerosol particle types.

8. The method of claim 5, wherein the rate of change of the absorbance spectra is indicative of aerosol particles of less than 300 nm diameter.

9. The method of claim 5, wherein the rate of change of the absorbance spectra is indicative of ultrafine aerosol particles of less than 100 nm diameter.

10. The method of claim 6, wherein determining an air quality further comprises:

subtracting a baseline filter absorbance spectra from the absorbance spectra to determine an aerosol absorbance spectra, wherein the baseline filter absorbance spectra is based on at least one of a filter type and a filter media;

determining the absolute absorbance for each of the one or more aerosol particle types;

determining a mass accumulation rate based on the absolute absorbance of each of the one or more aerosol particle types and the mass concentration of each of the one or more aerosol particle types; and determining an air quality score based on the mass accumulation rate and a flowrate through the filter.

11. The method of claim 1, wherein the absorbance spectra of the aerosol particles captured on the filter is measured via a measurement system comprising:

one or more light source; and one or more light detector.

12. The method of claim 11, wherein the one or more light source comprises a laser source at least at each of a 395 nm, a 460 nm, a 650 nm, and a 960 nm wavelength, and wherein the one or more light detector comprises a light detector responsive to light at least at each of the 395 nm, the 460 nm, the 650 nm, and the 960 nm wavelength.

13. The method of claim 11, wherein the one or more light source comprises a light emitting diode (LED) source at least at each of a 395 nm, a 460 nm, a 650 nm, and a 960 nm wavelength, and wherein the one or more light detector comprises a light detector responsive to light at least at each of the 395 nm, the 460 nm, the 650 nm, and the 960 nm wavelength.

14. The method of claim 11, wherein the one or more light source emits polychromatic light within the UV, visible, and NIR wavelength range, and wherein the one or more light detector comprises one or more light filters at least at each of a UV wavelength range, a visible blue wavelength range, a visible red wavelength range, and a NIR wavelength range.

15. The method of claim 11, wherein the one or more light source emits polychromatic light within the UV, visible, and NIR wavelength range, and wherein the one or more light detector comprises a spectrometer configured to determine an amount of light as a function of wavelength within the UV, visible, and NIR wavelength range.

16. A computer-readable storage medium comprising instructions that configure one or more programmable processors to:

identify one or more aerosol particle types based on an absorbance spectra of aerosol particles captured on a filter;

determine a mass concentration of each of the one or more aerosol particle types based on the absorbance spectra and the aerosol particle type;

detect a median particle size of each of the one or more aerosol particle types based on a rate of change of the absorbance spectra and the aerosol particle type;

determine an air quality metric based on the identified one or more aerosol particle types, the determined mass concentration of each of the one or more aerosol particle types, and the determined median particle size of each of the one or more aerosol particle types; and display the air quality metric.

17. The computer-readable storage medium of claim 16 further comprising instructions that configure the one or more programmable processors to:

subtract a baseline filter absorbance spectra from the absorbance spectra to determine an aerosol absorbance spectra, wherein the baseline filter absorbance spectra is based on at least one of a filter type and a filter media;

determine an absorbance angstrom exponent for each of the one or more aerosol particle types; and compare the absorbance angstrom exponent of each of the one or more aerosol particle types to a predetermined absorbance angstrom exponent per particle size curve of each of the one or more aerosol particle types.

18. The computer-readable storage medium of claim 16 further comprising instructions that configure the one or more programmable processors to:

determine the absolute absorbance for each of the one or more aerosol particle types;

determine the mass concentration based on the absolute absorbance of each of the one or more aerosol particle types and a predetermined absorbance per mass curve of each of the one or more aerosol particle types;

determine a mass accumulation rate based on the absolute absorbance of each of the one or more aerosol particle types and the mass concentration of each of the one or more aerosol particle types; and determine an air quality score based on the mass accumulation rate and a flowrate through the filter.

19. The computer-readable storage medium of claim 18, wherein the absorbance spectra of the aerosol particles captured on the filter is within a wavelength band encompassing ultraviolet (UV), visible, and near infrared (NIR) wavelengths.

20. A system comprising:

one or more light source;

one or more detector;

at least one computer-readable storage medium comprising instructions that configure one or more programmable processors to:

identify one or more aerosol particle types based on an absorbance spectra of aerosol particles captured on a filter;

determine a mass concentration of each of the one or more aerosol particle types based on the absorbance spectra and the aerosol particle type;

detect a median particle size of each of the one or more aerosol particle types based on a rate of change of the absorbance spectra and the aerosol particle type; and determine an air quality metric based on the identified one or more aerosol particle types, the determined mass concentration of each of the one or more aerosol particle types, and the determined median particle size of each of the one or more aerosol particle types; and display the air quality metric.

* * * * *